US006851328B2

(12) United States Patent
Umemoto et al.

(10) Patent No.: US 6,851,328 B2
(45) Date of Patent: Feb. 8, 2005

(54) CONTROL APPARATUS FOR TRANSMISSION

(75) Inventors: Susumu Umemoto, Sakai (JP); Tetsuo Yamaguchi, Sakai (JP); Hidetoshi Hana, Sakai (JP); Isamu Kawai, Sakai (JP); Takashi Yasumi, Sakai (JP); Yoshifumi Horiuchi, Sakai (JP); Tetsu Fukui, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/400,154

(22) Filed: Mar. 26, 2003

(65) Prior Publication Data

US 2003/0226416 A1 Dec. 11, 2003

(30) Foreign Application Priority Data

| Apr. 18, 2002 | (JP) | 2002-116194 |
|---|---|---|
| May 24, 2002 | (JP) | 2002-151197 |
| May 24, 2002 | (JP) | 2002-151198 |
| May 29, 2002 | (JP) | 2002-155228 |
| May 29, 2002 | (JP) | 2002-155229 |

(51) Int. Cl.$^7$ ............................................. F16H 63/00
(52) U.S. Cl. ............................ 74/335; 74/334; 74/335; 74/336 R; 477/97; 477/116; 477/124; 477/900; 477/904; 192/48.9; 192/48.91; 192/51
(58) Field of Search ..................... 74/331, 335, 336 R, 74/334; 477/97, 116, 123, 124, 900, 904; 192/51, 48.9, 48.91

(56) References Cited

U.S. PATENT DOCUMENTS 4,106,364 A * 8/1978 Zenker et al. ................ 74/745

| 4,579,015 A | | 4/1986 | Fukui |
| 4,637,269 A | | 1/1987 | Hasegawa et al. |
| 5,050,079 A | * | 9/1991 | Steeby ........................ 701/52 |
| 5,233,525 A | * | 8/1993 | Overmann et al. ........... 701/55 |
| 5,407,042 A | * | 4/1995 | Fukui et al. ............... 192/3.58 |
| 5,613,401 A | * | 3/1997 | Maurizio ..................... 74/325 |
| 6,113,516 A | * | 9/2000 | Janecke ..................... 477/124 |
| 6,220,987 B1 | * | 4/2001 | Robichaux et al. ........... 477/97 |
| 6,491,604 B1 | * | 12/2002 | Katou et al. ................ 477/154 |

FOREIGN PATENT DOCUMENTS

| EP | 0 797 025 A1 | 9/1997 |
| JP | 06-313478 | 11/1994 |

* cited by examiner

*Primary Examiner*—Saul Rodriguez
*Assistant Examiner*—David D. Le
(74) *Attorney, Agent, or Firm*—Webb Ziesenheim Logdson Orkin & Hanson, P.C.

(57) ABSTRACT

A transmission control apparatus includes transmission lines disposed between a pair of transmission shafts and a hydraulic multiple disc transmission clutch disposed on one side of the transmission lines. Power from an engine is transmitted via one of the transmission lines to a traveling unit. Each of the transmission lines has a friction clutch. A first gear mechanism operated by a first actuator is disposed between one of the transmission shafts and the first transmission line. A second gear mechanism operated by a second actuator is disposed between one of the transmission shafts and the second transmission line. When the first transmission line is powered, a first system operates the second gear mechanism into a speed position; the first clutch to a non-transmitting state and the second clutch to a transmitting state, thereby providing a progressive shifting of the transmission clutch from a transmitting state to a semi-transmitting state.

31 Claims, 13 Drawing Sheets

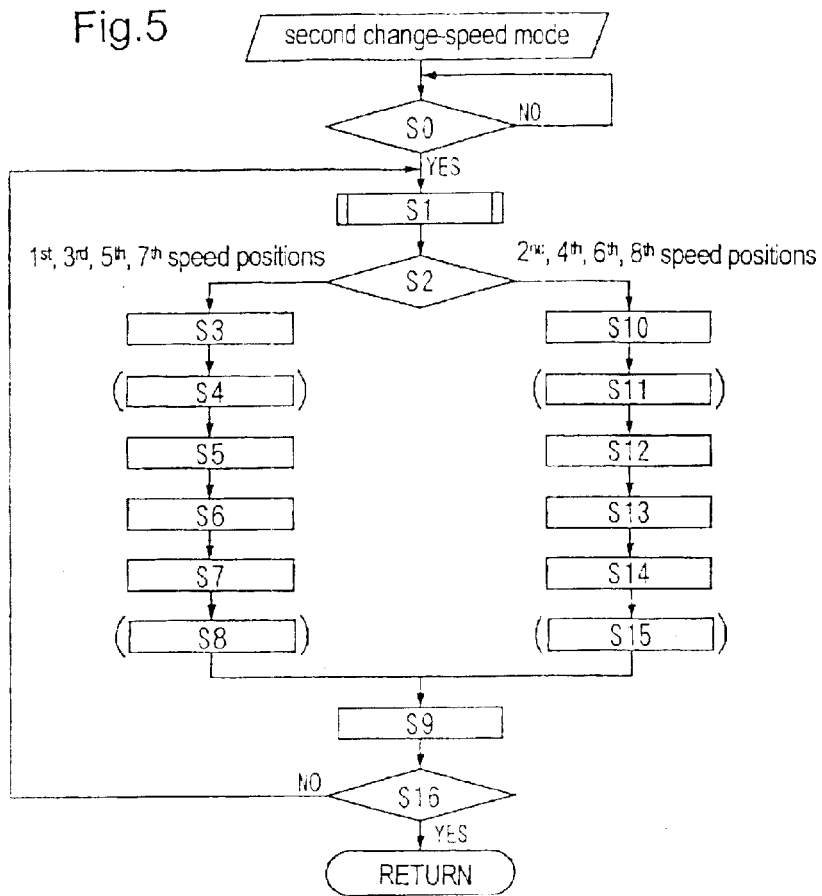

Fig.5

- S0  change-speed lever 63 operated?
- S1  set working pressure P2
- S2  operated position?
- S3  operate shifter 26 to next speed position (lower or higher position L, H)
- S4  operate shifter 34 to next speed position (lower or higher position L, H)
- S5  reduce transmission clutch 6 to working pressure P2 to operate it into semi-transmitting state
- S6  operate second friction clutch 12 to transmitting state and also operate first friction clutch 9 to non-transmitting state
- S7  operate shifter 23 to neutral position N
- S8  operate shifter 31 to next speed position (lower or higher position L, H)

- S10  operate shifter 23 to next speed position (lower or higher position L, H)
- S11  operate shifter 31 to next speed position (lower or higher position L, H)
- S12  reduce transmission clutch 6 to working pressure P2 to operate it into semi-transmitting state
- S13  operate first friction clutch 9 to transmitting state and also operate second friction clutch 12 to non-transmitting state
- S14  operate shifter 26 to neutral position N
- S15  operate shifter 34 to next speed position (lower or higher position L, H)

- S9  progressively raise transmission clutch to working pressure P1 to operate it into transmitting state
- S16  operated position of change-speed lever 63?

Fig.6

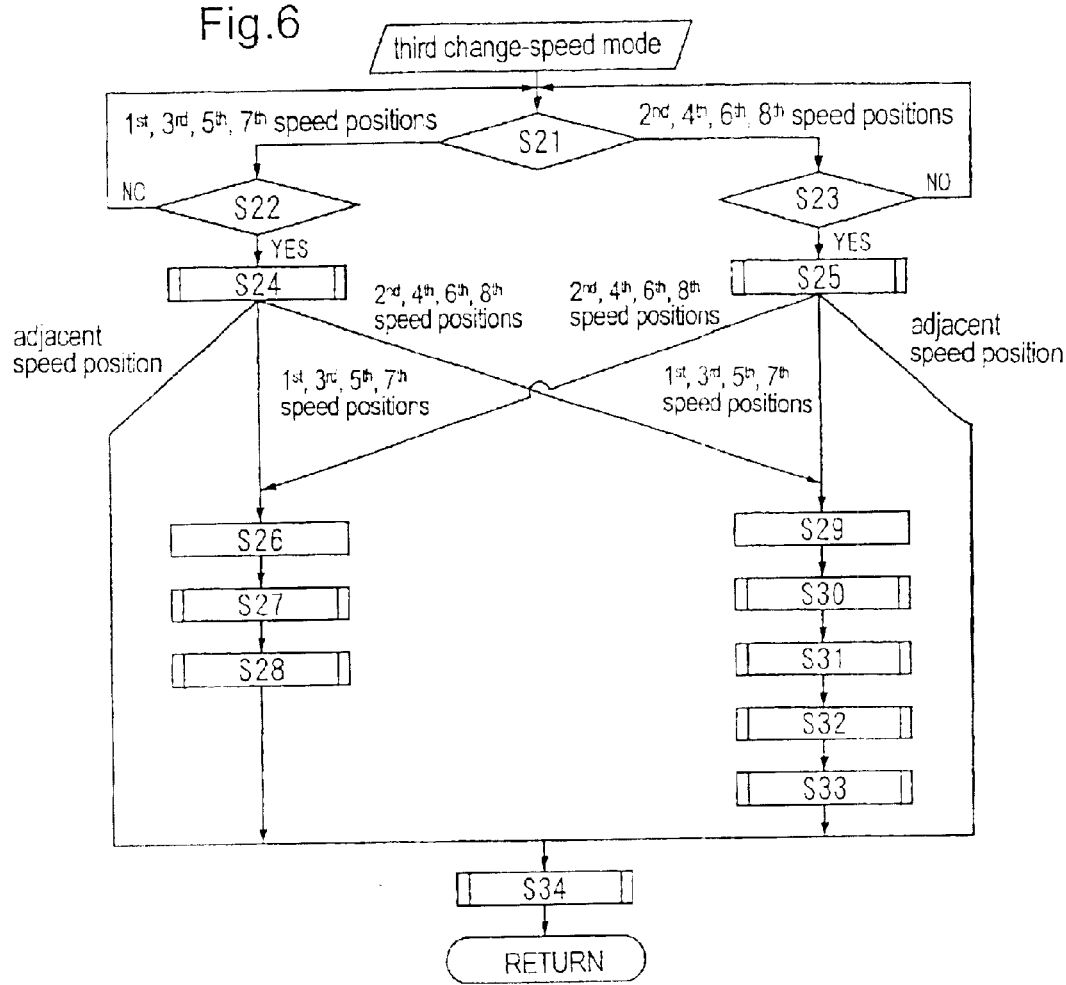

S21 operated position of change-speed lever 63?

S22 change-speed lever 63 operated?
S24 set working pressure P2

S26 set first intermediate speed position
S27 change-speed operation to first intermediate speed position
S28 set working pressure P2

S23 change-speed lever 63 operated?
S25 set working pressure P2

S29 set first and second intermediate speed positions
S30 change-speed operation to first intermediate speed position
S31 set working pressure P2
S32 change-speed operation to second intermediate speed position
S33 set working pressure P2

S34 change-speed operation to operated position of change-speed lever 63

Fig.7

| | first gear change-speed mechanism 13 first auxiliary gear change-speed mechanism 14 | | | second gear change-speed mechanism 15 second auxiliary gear change-speed mechanism 16 | | |
|---|---|---|---|---|---|---|
| | shifter 23 | shifter 31 | first friction clutch 9 | shifter 26 | shifter 34 | second friction clutch 12 |
| 1st speed position | L | L | transmitting | N | L | non-transmitting |
| 2nd speed position | N | L | non-transmitting | L | L | transmitting |
| 3rd speed position | H | L | transmitting | N | L | non-transmitting |
| 4th speed position | N | L | non-transmitting | H | L | transmitting |
| 5th speed position | L | H | transmitting | N | H | non-transmitting |
| 6th speed position | N | H | non-transmitting | L | H | transmitting |
| 7th speed position | H | H | transmitting | N | H | non-transmitting |
| 8th speed position | N | H | non-transmitting | H | H | transmitting |

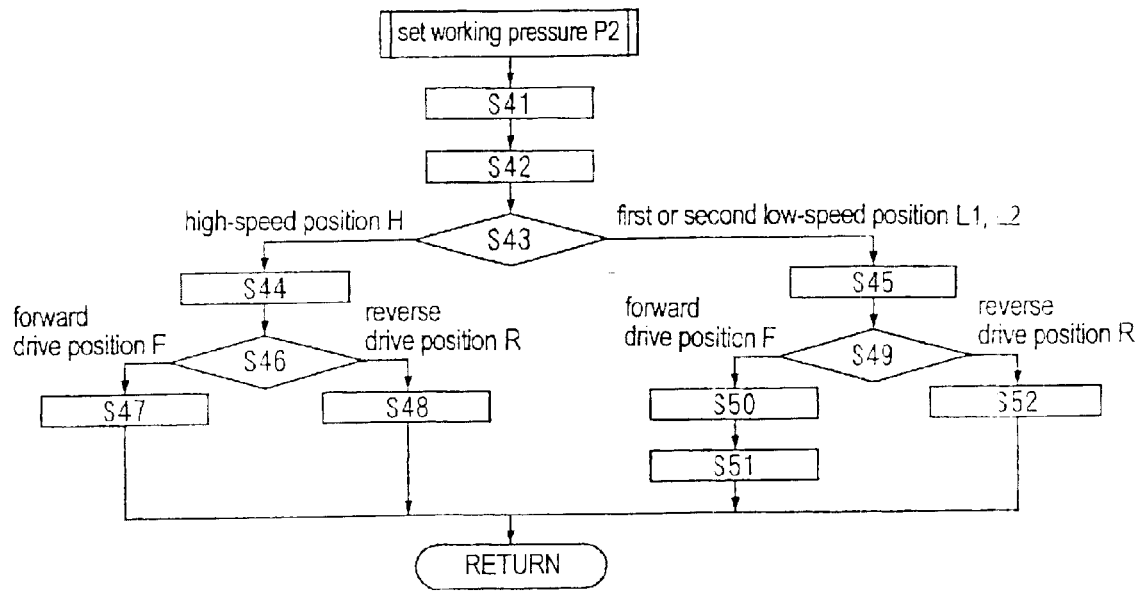

Fig.8

S41  detect revolution difference N based on detection value from revolution sensor 67
S42  set working pressure P2 based on revolution difference N
S43  operated position of auxiliary change-speed lever 66?

S44  adjust working pressure P2 to lower side
S46  operated position of forward/reverse lever 57?

S47  adjust working pressure P2 to higher side
S48  adjust working pressure P2 to lower side S45  adjust working pressure P2 to higher side
S49  operated position of forward/reverse lever 57?

S50  detect operated position of change-speed lever 63
S51  adjust working pressure P2 based on operated position of change-speed lever 63
S52  adjust working pressure P2 to lower side

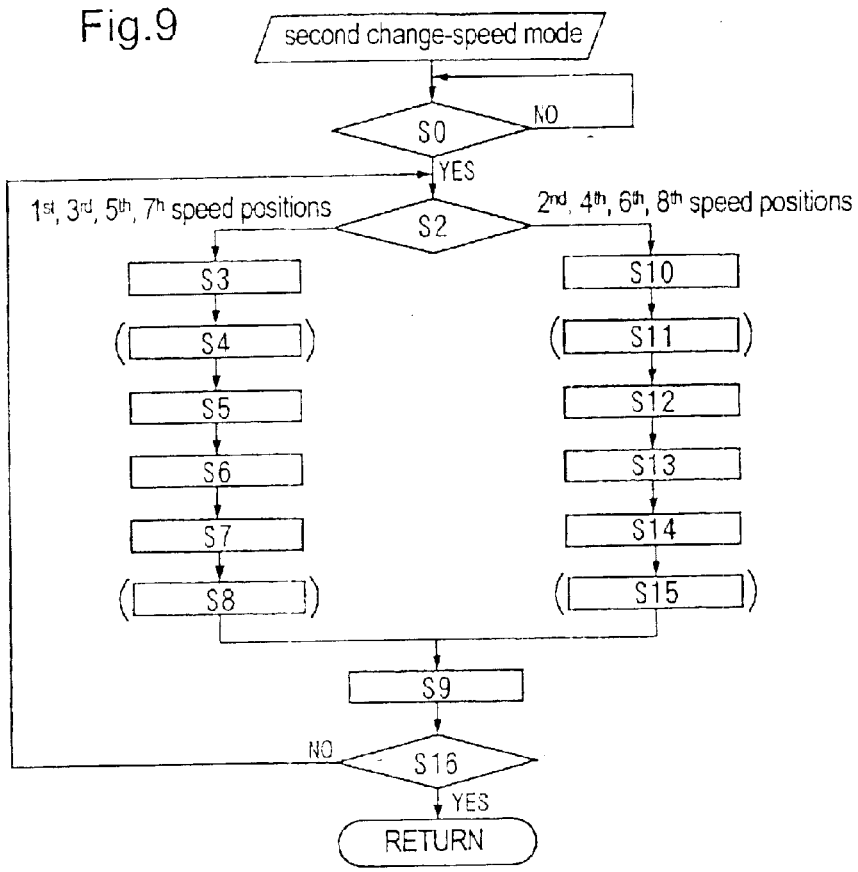

Fig.9

- S0  change-speed lever 63 operated?
- S2  operated position?
- S3  operate shifter 26 to next speed position (lower or higher position L, H)
- S4  operate shifter 34 to next speed position (lower or higher position L, H)
- S5  reduce transmission clutch 6 to working pressure P2 to operate it into semi-transmitting state
- S6  operate second friction clutch 12 to transmitting state and also operate first friction clutch 9 to non-transmitting state
- S7  operate shifter 23 to neutral position N
- S8  operate shifter 31 to next speed position (lower or higher position L, H)

- S10  operate shifter 23 to next speed position (lower or higher position L, H)
- S11  operate shifter 31 to next speed position (lower or higher position L, H)
- S12  reduce transmission clutch 6 to working pressure P2 to operate it into semi-transmitting state
- S13  operate first friction clutch 9 to transmitting state and also operate second friction clutch 12 to non-transmitting state
- S14  operate shifter 26 to neutral position N
- S15  operate shifter 34 to next speed position (lower or higher position L, H)

- S9   progressively raise transmission clutch to working pressure P1 to operate it into transmitting state
- S16  operated position of change-speed lever 63?

Fig. 10

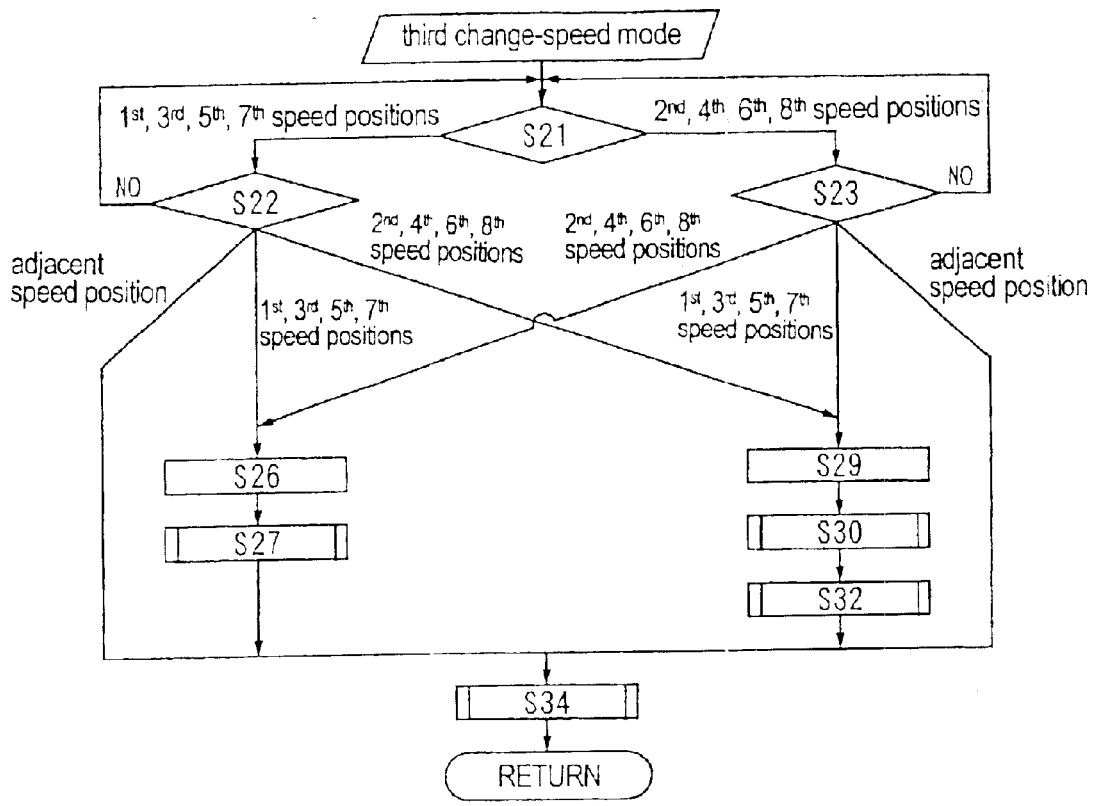

S21 operated position of change-speed lever 63?

S22 change-speed lever 63 operated?
S23 set working pressure P2

S26 set first intermediate speed position
S27 change-speed operation to first intermediate speed position S29 set first and second intermediate speed positions
S30 change-speed operation to first intermediate speed position
S32 change-speed operation to second intermediate speed position S34 change-speed operation to operated position of change-speed lever 63

CONTROL APPARATUS FOR TRANSMISSION

BACKGROUND OF THE INVENTION

1. Field of the Invention

The present invention relates to a control apparatus for a work-vehicle transmission having a transmission clutch and a gear change-speed mechanism. This control apparatus is operable, in response to an instruction for change speed, to automatically operate the transmission clutch into a non-transmitting state to operate the gear change-speed mechanism by means of an actuator and subsequently to automatically operate the transmission clutch back to a transmitting state.

2. Description of the Related Art

An example of the work-vehicle transmission to be controlled by the above-described control apparatus is disclosed by Japanese Patent Application "Kokai" No.: Hei. 6-313478. In this, a gear change-speed mechanism (denoted with a mark A in FIG. 1) to be operated by actuators (denoted with marks T1, T2 in FIG. 1) and a hydraulic multiple disc clutch (denoted with numeral 19 in FIG. 1) are arranged in series. With this, in response to a change-speed instruction from the control apparatus, the transmission clutch is automatically operated into the non-transmitting state and the gear change-speed mechanism is operated by the actuators. Upon completion of this operation of the gear change-speed mechanism by the actuators, the transmission clutch is automatically and gradually operated into the transmitting state.

A work vehicle is often subjected to a large load such as when the vehicle runs on a soft ground surface providing a significant running resistance to the vehicle or when the vehicle tows a cart mounting load therein. Hence, when the transmission clutch is operated into the non-transmitting state, the power transmission from the engine to a traveling unit of the vehicle is broken at this timing, whereby the traveling speed of the vehicle may be reduced suddenly due to the traveling load. Then, under this condition when the traveling speed of the vehicle has been reduced significantly with completion of the operation of the gear change-speed mechanism by the actuator, if the transmission clutch is operated back to the transmitting state thereby to connect the power of the engine to the traveling unit, this will result in sudden acceleration of the vehicle to the previous traveling speed before the speed reduction, thus giving a significant shock to the operator.

In this respect, according to the construction disclosed by the above document, there is provided an auxiliary transmission clutch (denoted with mark E in FIG. 1) capable of transmitting the power from the gear change-speed mechanism to the downstream side with bypassing the (main) transmission clutch. With this construction, when the transmission clutch is operated into the non-transmitting state as described above, the auxiliary transmission clutch is operated from its non-transmitting state to its transmitting state, whereby the power from the gear change-speed mechanism is transmitted via this auxiliary transmission clutch to the downstream side, thus restricting reduction in the traveling speed of the vehicle due to the traveling load. Then, when the transmission clutch is operated back to the transmitting stage after completion of the operation of the gear change-speed mechanism by the actuator, the auxiliary transmission clutch is operated from the transmitting state to the non-transmitting state. In this way, the construction functions to restrict occurrence of sudden acceleration of the vehicle to the previous high traveling speed, thus restricting occurrence of shock associated therewith.

In the case of the above-described construction disclosed by the gazette, while the operation of the gear change-speed mechanism is going on with the transmission clutch being at its non-transmitting stage, the power from the gear change-speed mechanism is transmitted to the downstream via the auxiliary transmission clutch. In this, the transmission ratio (the transmission ratio of the gear shown on the left end of a gear reduction mechanism shown in FIG. 1 of the gazette) of the power being transmitted via the auxiliary transmission clutch remains substantially fixed. With this, if a change-speed operation is effected at a higher speed range than the transmission ratio of the power transmitted via the auxiliary transmission clutch (e.g. when the transmission ratios provided by speed positions before and after the change-speed operation are higher than the transmission ratio of the power transmitted via the auxiliary transmission clutch), such change-speed operation result in change from the condition of the power being transmitted at the transmission ratio provided by the high speed position to the condition of the power being transmitted at the transmission ratio at the lower speed provided by the auxiliary transmission clutch. Hence, such operation will again cause a shock.

SUMMARY OF THE INVENTION

A primary object of the present invention is to provide a control apparatus for a work-vehicle transmission capable of reducing a change-speed shock when the transmission clutch is operated, in response to a change-speed instruction to automatically operate the transmission clutch into the non-transmitting state to operate the gear change-speed mechanism by means of an actuator and subsequently operate the transmission clutch back to the transmitting state.

The typical work-vehicle transmission to which the invention is applied, includes:

first and second transmission lines disposed in parallel between an upstream transmission shaft for receiving power from an engine and a downstream transmission shaft for transmitting the power to a traveling unit;

a hydraulic multiple disc transmission dutch disposed transmission-wise upstream or downstream of the first and second transmission lines, the power of the upstream transmission shaft being transmitted via one of the first and second transmission lines to the downstream transmission shaft;

a first gear change-speed mechanism disposed between either the upstream transmission shaft or the downstream transmission shaft and the first transmission line, the first gear change-speed mechanism having a plurality of speed positions;

a first actuator for operating the first gear change-speed mechanism;

a first friction clutch incorporated in the first transmission line;

a second gear change-speed mechanism disposed between either the upstream transmission shaft or the downstream transmission shaft and the second transmission line, the second gear change-speed mechanism having a plurality of speed positions;

a second actuator for operating the second gear change-speed mechanism; and a second friction clutch incorporated in the second transmission line.

For such work-vehicle transmission as described above, a control apparatus according to the invention comprises first controlling means and second controlling means. When the power is being transmitted via the first transmission line, the first controlling means operates the second gear change-speed mechanism into a predetermined speed position by means of the second actuator and operates the first friction clutch from a transmitting state to a non-transmitting state and simultaneously operates the second friction clutch from a non-transmitting state to a transmitting state, thereby to realize a progressive shifting of the transmission clutch from a transmitting state to a semi-transmitting state. When the power is being transmitted via the second transmission line, the second controlling means operates the first gear change-speed mechanism into a predetermined speed position by means of the first actuator and operates the first friction clutch from the non-transmitting state to the transmitting state and simultaneously operates the second friction clutch from the transmitting state to the non-transmitting state, thereby to realize a progressive shifting of the transmission clutch from the transmitting state to the semi-transmitting state.

Thanks to the control apparatus having the above-described construction, during a change-speed operation, the second friction clutch is operated from the non-transmitting state to the transmitting state and at the same time the first friction clutch is operated from the transmitting state to the non-transmitting state, or conversely, the second friction clutch is operated from the transmitting state to the non-transmitting state while the first friction clutch is operated from the non-transmitting state to the transmitting state. In whichever case, there is realized a condition ("dual-transmitting condition" hereinafter) in which the power of the upstream transmission shaft is provided in distribution to both the first and second transmission lines and then the distributed powers from the first and second transmission lines are provided as combined together to the downstream transmission line. Hence, even if a torque variation occurs in this dual-transmitting condition, such torque variation will be effectively absorbed by slipping of the transmission clutch under its semi-transmitting state, so that the power may be transmitted with reduced torque variation to the traveling unit. That is to say, when a change-speed operation is taking place, the dual-transmitting condition is realized and the power with reduced or minimized torque variation can be transmitted to the traveling unit. As a result, it has become possible to restrict, during a change-speed operation, occurrence of reduction in the traveling speed of the work vehicle due to the traveling load. So that, it has become possible to avoid the sudden reduction in the traveling speed of the vehicle due to traveling load and the resultant shock in association of the subsequent operation of the transmission clutch to its transmitting state under such speed reduced condition. In this transmission, the first and second gear change-speed mechanisms each has a plurality of speed positions. Hence, in realizing the dual-transmitting condition, in case the power is being transmitted via the first transmission line (i.e. when the first gear change-speed mechanism is set at a predetermined speed position and the first friction clutch is under is transmitting state), the second gear change-speed mechanism can be operated to an appropriate speed position selected from the plurality of speed positions available. On the other hand, in case the power is being transmitted via the second transmission line (i.e. when the second gear change-speed mechanism is set at a predetermined speed position and the second friction clutch is under its transmitting state), the first gear change-speed mechanism can be operated to an appropriate speed position selected from the plurality of speed positions available.

Consequently, it has become possible to avoid also the above-described further case of shock occurrence which results from shifting from the condition where the power is transmitted at a transmission ratio provided by a high speed position to the condition where the power is transmitted at a transmission ratio provided by a low speed position and then back to the previous condition at the transmission ratio provided by the high speed position.

According to one preferred embodiment of the present invention, the control apparatus further comprises acceleration detecting means for detecting acceleration of the vehicle and the transmission clutch is operated from the semi-transmitting state to the transmitting state in such a manner that the acceleration of the vehicle may have a predetermined characteristics when the transmission clutch is progressively operated from the semi-transmitting state to the transmitting state by the first and second controlling means. With this feature, there is achieved a smooth acceleration (or deceleration) from the traveling speed of the vehicle corresponding to the speed position of the first transmission line (or the second transmission line) to the traveling speed of the vehicle corresponding to the speed position of the second transmission line (or the first transmission line).

According to a further preferred embodiment of the invention, a working pressure of the transmission clutch under its semi-transmitting state is variable. With this, the working pressure of the transmission clutch under the semi-transmitting state may be set to an appropriate value, in accordance with particular conditions of the work site (e.g. the softness or hardness of the ground or presence/absence of undulations on the ground, etc.), a traveling load being applied to the vehicle, a particular condition of an implement mounted on the vehicle, etc. Consequently, by appropriately setting the working pressure of the transmission clutch under its semi-transmitting state, when the power with reduced torque variation is transmitted via this transmission clutch under the semi-transmitting state to the traveling unit during a change-speed operation, this power transmitted to the traveling unit may be appropriately set, depending on the various conditions described above.

According to a still further preferred embodiment of the present invention, the traveling load to the vehicle is detected and the working pressure of the transmission clutch under its semi-transmitting state is increased in response to increase in the detected traveling load. In the above condition when the power with reduced torque variation is being transmitted to the traveling unit via the transmission clutch under the semi-transmitting state during a change-speed operation, it is expected that the reduction in the traveling speed of the vehicle will be significant if the traveling load is large. Then, by increasing the working pressure of the transmission clutch under the semi-transmitting state, when the transmission clutch is operated subsequently from the transmitting state to the semi-transmitting state and then progressively to the transmitting state, the transmission clutch can reach the transmitting state quickly. Therefore, in the case of large traveling load, the transmission clutch can reach the transmitting state to complete the change-speed operation before the traveling speed of the vehicle is reduced significantly.

As other preferred constructions to be provided for the detection of traveling load, it is also possible to detect a difference between a revolution of the engine under zero load condition and a current revolution of the engine and detect the traveling load based on the revolution difference or to detect a reduction ratio in the traveling speed of the vehicle at the time of start of a change-speed operation and detect the traveling load based on the detected reduction ratio in the traveling speed of the vehicle.

With a work vehicle, in general, the traveling load applied to the vehicle body will be greater in a high-speed working run than in a low-speed working run (for instance, in the case of an agricultural tractor, the traveling load applied to its vehicle body will be greater in a leveling work run (high-speed working run) in which the vehicle travels with a plow connected thereto for leveling raised earth than in a plowing work run (low-speed working run) in which the vehicle travels with a rotary plow implement connected thereto). For this reason, according to a preferred embodiment of the invention, the working pressure of the transmission clutch under the semi-transmitting state in a high-speed working run is set higher than that in a low-speed working run. As a result, in the case of the high-speed working run, the transmission clutch can reach the transmitting state quickly to complete a change-speed operation before the traveling speed of the vehicle is reduced significantly.

Further, with such work vehicle as above, when an implement is connected to its vehicle body, in general, the work is carried out by the implement while the vehicle travels forward. And, the vehicle travels reverse with the implement being lifted off the ground surface (i.e. a condition for not effecting a work by the implement). For this reason, the traveling load applied to the vehicle will be greater in the case of the forward run than the reverse run. In view of this, according to a preferred embodiment of the invention, the working pressure of the transmission clutch under the semi-transmitting state is set higher for the forward run than the reverse run. As a result, in the case of the forward run, the transmission clutch can reach the transmitting state quickly to complete a change-speed operation before the traveling speed of the vehicle is reduced significantly.

Also, with such work vehicle as above, in general, the traveling load applied to the vehicle body will be greater during a working run than a road run (i.e. in a road run, the vehicle travels on a well-conditioned road such as a paved road. Whereas, in the working run, the vehicle has to travel generally on an unpaved road with a lot of surface unevenness, hence, a greater traveling load will be applied to the vehicle during a working run than a road run). In view of this, according to a preferred embodiment of the invention, the working pressure of the transmission clutch under the semi-transmitting state is set higher for the working run than the road run. As a result, in the case of the working run, the transmission clutch can reach the transmitting state quickly to complete a change-speed operation before the traveling speed of the vehicle is reduced significantly.

According to a still further preferred embodiment of the invention, there is provided an alternate control mode, in which the first controlling means and the second controlling means are activated alternately of each other from a previous speed position prior to the issuance of the change-speed instruction to a target speed position instructed by the change-speed instruction, thereby to realize the target speed position instructed by the change-speed instruction. With this feature, the above-described dual-transmitting condition and the power transmission with minimized torque variation will be realized in repetition in the course of shifting from the previous speed position prior to issuance of the change-speed instruction to the target speed position instructed by the change-speed instruction, so that the change-speed operation from the previous speed position prior to issuance of the change-speed instruction to the target speed position instructed by the change-speed instruction may take place smoothly and shocklessly.

Incidentally, when this alternate control mode is used, it may take a relatively long time until the completion of the shift from previous speed position prior to issuance of the change-speed instruction to the target speed position instructed by the change-speed instruction. In view of this, according to a further preferred embodiment of the invention, there is provided a first skip change-speed mode, in which there is provided an intermediate speed position substantially midway between previous speed position prior to issuance of the change-speed instruction to the target speed position instructed by the change-speed instruction, and one of the first and second controlling means is activated for realizing shift from the previous speed position prior to issuance of the change-speed instruction to the intermediate speed position and the other of the first and second controlling means is activated for realizing subsequent shift form the intermediate speed position to the target speed position instructed by the change-speed instruction.

According to a further embodiment of the invention, there is provided a second skip change-speed mode, in which there is provided an intermediate position slightly offset from the target speed position instructed by the change-speed instruction toward the previous speed position prior to the issuance of the change-speed instruction, and one of the first and second controlling means is activated for realizing shift from the previous speed position prior to issuance of the change-speed instruction to the intermediate speed position and the other of the first and second controlling means is activated for realizing subsequent shift form the intermediate speed position to the target speed position instructed by the change-speed instruction.

When either the first skip change-speed mode or the second skip change-speed mode is used, rather than alternately acting the first and second controlling means for the shifting from the previous speed position prior to issuance of the change-speed instruction to the target speed position instructed by the change-speed instruction, the shifting from the previous speed position to the target speed position is effected in two steps of first shifting from the previous speed position prior to issuance of the change-speed instruction to the intermediate speed position and then from this intermediate speed position to the target speed position instructed by the change-speed instruction. As a result, while restricting the change-speed shock, the period required for the shifting from the previous speed position prior to issuance of the change-speed instruction to the target speed position instructed by the change-speed instruction may be relatively short.

According to a still further preferred embodiment of the invention, there are provided a basic control mode and an alternate control mode one of which can be selected. According to a still further embodiment of the invention, there are provided a basic control mode and a skip change-speed mode one of which can be selected. In the basic control mode, upon issuance of a change-speed instruction, the transmission clutch is operated to the non-transmitting state and the first and second change-speed mechanism are operated to the change-speed position instructed by the change-speed instruction by means of the first and second actuators respectively, thereby to operate the transmission clutch to the transmitting state progressively. In the alternate control mode, the first and second controlling means are alternately actuated until completion of shifting from the previous speed position prior to the issuance of the change-speed instruction to the target speed position instructed by the change-speed instruction, thereby to realize the shifting to the target speed position instructed by the change-speed instruction. In the skip change-speed mode, in which there is provided an intermediate speed position substantially midway between the previous speed position prior to issuance of the change-speed instruction to the target speed position instructed by the change-speed instruction, and one of the first and second controlling means is activated for realizing shift from the previous speed position prior to issuance of the change-speed instruction to the intermediate speed position and the other of the first and second controlling means is activated for realizing subsequent shift form the intermediate speed position to the target speed position instructed by the change-speed instruction.

The basic mode described above is a change-speed control mode which places priority on the speediness of the change-speed operation, rather than on the prevention of change-speed shock. On the other hand, in the alternate control mode, the above-described dual-transmitting condition and the power transmission with minimized torque variation will be realized in repetition in the course of shifting from the previous speed position prior to issuance of the change-speed instruction to the target speed position instructed by the change-speed instruction. So, this is a change-speed control mode for realizing shockless shift from the previous speed position prior to issuance of the change-speed instruction to the target speed position instructed by the change-speed instruction. Further, in the skip change-speed mode, in the realization of the dual-transmitting state and the power transmission with reduced torque variation to the traveling unit, the time required for shifting from the previous speed position prior to issuance of the change-speed instruction to the target speed position instructed by the change-speed instruction is shorter, in comparison with the alternate control mode. Hence, this is a mode designed to achieve both speediness of change-speed operation and low change-speed shock at one time.

Preferably, manual selecting means is provided for allowing manual selection between the basic control mode and the alternate control mode or between the basic control mode and the skip change-speed mode. With this, an operator may advantageously make an appropriate selection, based on his/her own judgment, between the basic control mode and the alternate control mode or between the basic control mode and the skip change-speed mode.

For instance, when the vehicle travels on a paved road, the traveling load applied to the vehicle is relatively small. Whereas, when the vehicle travels on a ground surface of uneven work site or a muddy site, the traveling load applied to the vehicle will be relatively large. Further, when the vehicle tows an empty cart, the traveling load to the vehicle is relatively small. Whereas, when the vehicle tows a cart mounting a heavy load, the traveling load to the vehicle is relatively large. In these, in the case of small load (towing load), the basic control mode is appropriate for controlling a change-speed operation. Conversely, in the case of large load (towing load), the reduction in the traveling speed of the vehicle associated with a change-speed operation will be significant. For a change-speed control in this case, the alternate control mode or the skip change-speed mode is appropriate. Advantageously, when the traveling load (towing load) applied to the vehicle is below a predetermined value, the basic mode is automatically selected, whereas, when the traveling load (towing load) exceeds the predetermined value, the alternative control mode or the skip change-speed mode is automatically selected.

When a ground-work implement is connected to the vehicle body, in order to maintain the towing load applied to the vehicle body from this ground-work implement at a predetermined value, a draft operation for lifting up and down the ground-work implement relative to the vehicle body is sometimes effected. In this case, since a large towing load is applied from the ground-work implement to the vehicle body during the draft operation, the alternate control mode or the skip change-speed mode is appropriate. And, advantageously, the selection of this mode is automatically effected.

When the vehicle is traveling at a high speed, the inertia of the vehicle body is relatively large. Hence, the reduction in the traveling speed of the vehicle associated with a change-speed operation will be relatively small. Hence, the basic control mode is appropriate. Conversely, when the vehicle is traveling at a low speed, the inertia of the vehicle body is relatively small. Hence, the reduction in the traveling speed of the vehicle associated with a change-speed operation will be relatively large. Hence, the alternate control mode or the skip change-speed mode is appropriate. Therefore, advantageously, when the traveling speed of the vehicle is high, the basic mode is automatically selected, whereas, when the traveling speed of the vehicle is low, the alternative control mode or the skip change-speed mode is automatically selected.

When the ground-work implement is connected to the vehicle body, if the altitude of this ground-work implement relative to the vehicle body is higher than a predetermined value, it may be judged that the vehicle is engaged in e.g. a road run not effecting any work by the ground-work implement. Therefore, if the altitude of this ground-work implement relative to the vehicle body is higher than a predetermined value, it may be judged that the reduction in the traveling speed of the vehicle associated with a change-speed operation will be relatively small. Hence, for a change-speed control in this condition, the basic control mode is appropriate.

On the other hand, if the altitude of this ground-work implement relative to the vehicle body is lower than the predetermined value, it may be judged that the vehicle is engaged in e.g. a working run effecting a work by the ground-work implement. Therefore, if the altitude of this ground-work implement relative to the vehicle body is lower than the predetermined value, it may be judged that the reduction in the traveling speed of the vehicle associated with a change-speed operation will be relatively large. Hence, for a change-speed control in this condition, the alternate control mode or the skip change-speed mode is appropriate.

Another type of work-vehicle transmission to which the present invention may be applied includes a forward/reverse switchover mechanism disposed transmission-wise downstream of the first and second transmission lines and having a forward traveling clutch and a reverse traveling clutch both of which comprise a hydraulic multiple disc type. In the case of this type of transmission, the above-described functions of the transmission clutch in the foregoing transmission may be assigned to this forward/reverse switchover mechanism.

Further and other features and advantages of the invention will become apparent from the following detailed description of preferred embodiments thereof with reference to the accompanying drawings.

BRIEF DESCRIPTION OF THE DRAWINGS

FIG. 5 is a flowchart illustrating flow of the second change-speed mode, FIG. 6 is a flowchart illustrating flow of a third change-speed mode, FIG. 7 is a table showing conditions of shifters and first and second friction clutches at first through eighth speed positions, FIG. 8 is a flowchart illustrating flow for setting a working pressure, FIG. 9 is a flowchart illustrating flow of the second change-speed mode in which the working pressure is not set for each change-speed operation, FIG. 10 is a flowchart illustrating flow of the third change-speed mode in which the working pressure is not set for each change-speed operation.

DESCRIPTION OF THE PREFERRED EMBODIMENTS

[1]

Figure 1:
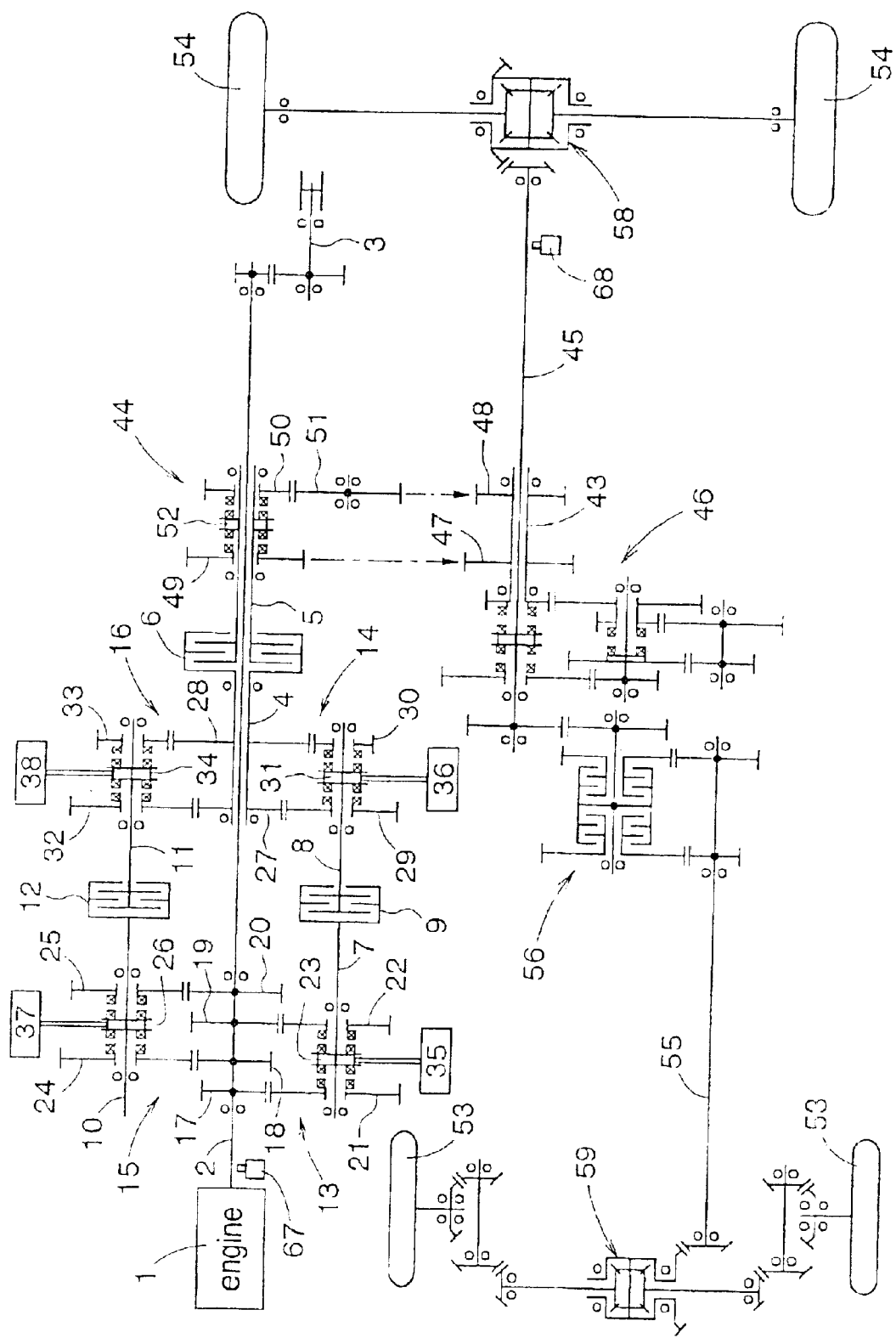
FIG. 1 is a schematic view showing a construction of a transmission to which the present invention is to be applied.

FIG. 1 shows a traveling transmission line of a four-wheel-drive agricultural tractor as an example of a work vehicle. In this, power of an engine 1 is transmitted to a transmission shaft 2 and to PTO shaft 3. On the transmission shaft 2, tubular transmission shafts 4, 5 are mounted to be rotatable relative to each other and a hydraulic multiple-disc friction type transmission clutch 6 is interposed between the transmission shafts 4, 5. In response to supply of a working fluid thereto, the transmission clutch 6 is operated to a power transmitting state. In response to discharge of the working fluid therefrom, the clutch 6 is operated to a power non-transmitting state.

As shown in FIG. 1, in parallel to the transmission shafts 2, 4, a first main transmission shaft 7 and a first auxiliary transmission shaft 8 are disposed. Between these first main and auxiliary transmission shafts 7, 8, a first friction clutch 9 is disposed. In parallel also to the transmission shafts 2, 4, a second main transmission shaft 10 and a second auxiliary transmission shaft 11 are disposed. Between these second main and auxiliary transmission shafts 10, 11, a second friction clutch 12 is disposed. Each of the first and second friction clutches 9, 12 is a hydraulic multiple-disc friction type and is operated to the transmitting state in response to supply of the working fluid thereto and to the non-transmitting state in response to discharge of the working fluid therefrom.

As shown in FIG. 1, between the transmission shaft 2 and the first main transmission shaft 7, a first gear change-speed mechanism 13 of a synchromesh type is provided. Further, between the transmission shaft 2 and the second main transmission shaft 10, a second gear change-speed mechanism 15 of a synchromesh type is provided. The transmission shaft 2 fixedly mounts thereon a first gear 17, a second gear 18, a third gear 19 and a fourth gear 20. The first gear 17 and the third gear 19 mesh with a low-speed gear 21 and a high-speed gear 22 rotatably mounted on the first main transmission shaft 7. And a shifter 23 is splined on the first main transmission shaft 7 to be rotatable therewith and slidable relative thereto. These arrangements together constitute the first gear change-speed mechanism 13. The second main transmission shaft 10 rotatably mounts a low-speed gear 24 and a high-speed gear 25 which mesh with the second gear 18 and the fourth gear 20. And, a shifter 26 is splined on the second main transmission shaft 10 to be rotatable therewith and sidable relative thereto. These arrangements together constitute the second gear change-speed mechanism 15.

As also shown in FIG. 1, between the transmission shaft 4 and the first auxiliary transmission shaft 8, there is interposed a first auxiliary gear change-speed mechanism 14 of the synchromesh type. Between the transmission shaft 4 and the second auxiliary transmission shaft 11, there is interposed a second auxiliary gear change-speed mechanism 16 of the synchromesh type. The first auxiliary transmission shaft 8 rotatably mounts a low-speed gear 29 and a high-speed gear 30 which mesh with the low-speed gear 27 and the high-speed gear 28. And, a shifter 31 is splined on the first auxiliary transmission shaft 8 to be rotatable therewith and sidable relative thereto. These arrangements together constitute the first auxiliary gear change-speed mechanism 14. The second auxiliary transmission shaft 11 rotatably mounts a low-speed gear 32 and a high-speed gear 33 which mesh with the low-speed gear 27 and the high-speed gear 28. And, a shifter 34 is splined on the second auxiliary transmission shaft 11 to be rotatable therewith and slidable relative thereto. These arrangements together constitute the second auxiliary gear change-speed mechanism 16.

With the above-described constructions, as described later in section [3], there are obtained a condition (the transmitting state of the first friction clutch 9) in which the power of the transmission shaft 2 is transmitted via the first main and auxiliary transmission shafts 7, 8 to the transmission shaft 4 and a further condition (the transmitting state of the second friction clutch 12) in which the power of the transmission shaft 2 is transmitted via the second main and auxiliary transmission shafts 10, 11 to the transmission shaft 4

As shown in FIG. 1, in the condition (the transmitting state of the first friction clutch 9) in which the power of the transmission shaft 2 is transmitted via the first main and auxiliary transmission shafts 7, 8 to the transmission shaft 4, the power of the transmission shaft 2 is changed in four speeds (first speed position, third speed position, fifth speed position and seventh speed position to be described later) via the first gear change-speed mechanism 13, the first main transmission shaft 7, the first friction clutch 9, the first auxiliary transmission shaft 8 and the first auxiliary gear change-speed mechanism 14 and transmitted to the transmission shaft 4.

As also shown in FIG. 1, in the further condition (the transmitting state of the second friction clutch 12) in which the power of the transmission shaft 2 is transmitted via the second main and auxiliary transmission shafts 10, 11 to the transmission shaft 4, the power of the transmission shaft 2 is changed in four speeds (second speed position, fourth speed position, sixth speed position and eighth speed position to be described later) via the second gear change-speed mechanism 15, the second main transmission shaft 10, the second friction clutch 12, the second auxiliary transmission shaft 11 and the second auxiliary gear change-speed mechanism 16 and transmitted to the transmission shaft 4.

[2]

As shown in FIG. 1, on downstream of the transmission shaft 5, there is disposed a tubular transmission shaft 43. Between the transmission shaft 5 and the transmission shaft 43, there is interposed a forward/reverse switchover mechanism 44 of the synchromesh type. The transmission shaft 43 is rotatably mounted on a transmission shaft 45. And, between the transmission shaft 43 and the transmission shaft 45, there is interposed an auxiliary change-speed mechanism 46 of the synchromesh type. Further, a front-wheel transmission shaft 55 for transmitting the power to front wheels 53 is provided. And, between the transmission shaft 45 and the front-wheel transmission shaft 55, there is provided a front-wheel change-speed mechanism 56 of the hydraulic clutch type.

Figure 2:
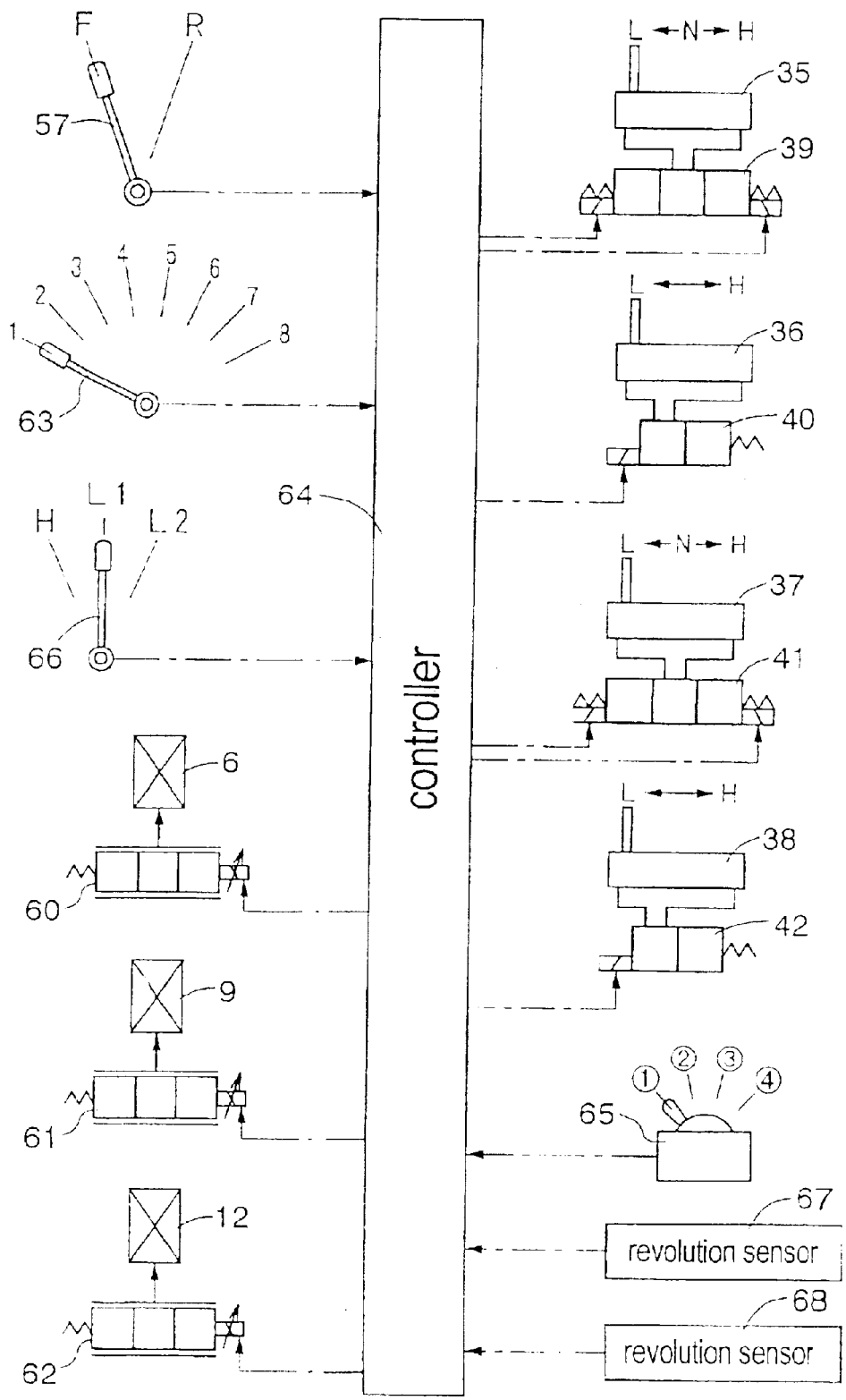
FIG. 2 is a diagram showing input and output devices for a control apparatus of the invention.

As also shown in FIG. 1, the transmission shaft 43 fixedly mounts a forward gear 47 and a reverse gear 48. The forward gear 47 meshes with a forward gear 49 rotatably mounted on the transmission shaft 5 and the reverse gear 48 meshes via an intermediate gear 51 with a reverse gear 50 rotatably mounted on the transmission shaft 5. A shifter 52 is splined is on the transmission shaft 5 to be rotatable therewith and slidable relative thereto. These arrangements together constitute the forward/reverse switchover mechanism 44. As shown in FIG. 2, the shifter 52 is mechanically linked with a forward/reverse lever 57. Then, by operating the forward/reverse lever 57 to a forward position F or a reverse position R thereby to slide the shifter 52 to mesh with the forward gear 49 or the reverse gear 50, the forward/reverse switchover mechanism 44 is operated.

As shown in FIG. 1, the auxiliary change-speed mechanism 46 is operable, by sliding operations of the two shifters, into a high-speed position H, a first low-speed position L1 and a second low-speed position L2 (the second low-speed position L2 provides a lower speed than the first low-speed position L1). As shown in FIG. 2, there is provided an auxiliary change-speed lever 66 for sliding the tow shifters. Then, the front-wheel change-speed mechanism 56 is operable into a standard condition in which the front wheels 53 and rear wheels 54 are driven at a same speed and an accelerated condition in which the front wheels 53 are driven at a higher speed than the rear wheels 54.

With the above-described constructions, in the straight traveling condition, the power of the transmission shaft 5 is transmitted via the forward/reverse switchover mechanism 44, the auxiliary change-speed mechanism 46, the transmission shaft 45 and a rear-wheel differential mechanism 58 to the rear wheels 54. And, the power of the auxiliary change-speed mechanism 46 is transmitted via the front-wheel change-speed mechanism 56 under the standard condition, the front-wheel transmission shaft 55 and a front-wheel differential mechanism 59 to the front wheels 53. When the front wheels 53 is steered to the right or to the left from the straight traveling position thereof, the front-wheel change-speed mechanism 56 is switched over from the standard condition to the accelerated condition, whereby the front wheels 53 are driven at a higher speed than the rear wheels 54, so that the vehicle can smoothly make a small turn.

[3]

As shown in FIG. 1 and FIG. 2, the first gear change-speed mechanism 13 includes a first actuator 35 of a double-acting hydraulic cylinder type for sliding the shifter 23 and a control valve 39 for supplying and discharging the working fluid to and from the first actuator 35. The first auxiliary gear change-speed mechanism 14 includes a first auxiliary actuator 36 of a double-acting hydraulic cylinder type for sliding the shifter 31 and a control valve 40 for supplying and discharging the working fluid to and from the first auxiliary actuator 36. The first actuator 35 is operable into a low-speed position L for meshing the shifter 23 with the low-speed gear 21, a high-speed position H for meshing the shifter 23 with the high-speed gear 22 and a neutral position N. The first auxiliary actuator 36 is operable into a low-speed position L for meshing the shifter 31 with the low-speed gear 29 and a high-speed position H for meshing the shifter 31 with the high-speed gear 30.

As shown also in FIG. 1 and FIG. 2, the second gear change-speed mechanism 15 includes a second actuator 37 of a double-acting hydraulic cylinder type for sliding the shifter 26 and a control valve 41 for supplying and discharging the working fluid to and from the second actuator 37. The second auxiliary gear change-speed mechanism 16 includes a second auxiliary actuator 38 of a double-acting hydraulic cylinder type for sliding the shifter 34 and a control valve 42 for supplying and discharging the working fluid to and from the second auxiliary actuator 38. The second actuator 37 is operable into a low-speed position L for meshing the shifter 26 with the low-speed gear 24, a high-speed position H for meshing the shifter 26 with the high-speed gear 25 and a neutral position N. The second auxiliary actuator 38 is operable into a low-speed position L for meshing the shifter 34 with the low-speed gear 32 and a high-speed position H for meshing the shifter 34 with the high-speed gear 33.

As shown in FIG. 2, there are provided a control valve 60 of an electromagnetic proportional reducing valve type for supplying and discharging the working fluid to and from the transmission clutch 6, a control valve 61 of an electromagnetic proportional reducing valve type for supplying and discharging the working fluid to and from the first friction clutch 9, and a control valve 62 of an electromagnetic proportional reducing valve type for supplying and discharging the working fluid to and from the second friction clutch 12.

With the above-described constructions, as shown in FIG. 1 and FIG. 7, in the condition (the transmitting state of the first friction clutch 9) in which the power of the transmission shaft 2 is transmitted via the first main and auxiliary transmission shafts 7, 8 to the transmission shaft 4, the first speed position is realized with the shifter 31 at its low-speed position L and the shifter 23 at its low-speed position L. The third speed position is realized with the shifter 31 at the low-speed position L and the shifter 23 at the high-speed position H. The fifth speed position is realized with the shifter 31 at the high-speed position H and the shifter 23 at the low-speed position L. The seventh speed position is realized with the shifter 31 at the high-speed position H and the shifter 23 at the high-speed position H. In the first and third speed positions described above, the second friction clutch 12 is operated to the non-transmitting state and the shifter 26 is at its neutral position N and the shifter 34 is at its low-speed position L. In the fifth and seventh speed positions described above, the second friction clutch 12 is operated to the non-transmitting state and the shifter 26 is at its neutral position N and the shifter 34 is at its high-speed position H.

As shown in FIG. 1 and FIG. 7, in the condition (the transmitting state of the second friction clutch 12) in which the power of the transmission shaft 2 is transmitted via the second main and auxiliary transmission shafts 10, 11 to the transmission shaft 4, the second speed position is realized with the shifter 34 at its low-speed position L and the shifter 26 at its low-speed position L. The fourth speed position is realized with the shifter 34 at the low-speed position L and the shifter 26 at the high-speed position H. The sixth speed position is realized with the shifter 34 at the high-speed position H and the shifter 26 at the low-speed position L. The eighth speed position is realized with the shifter 34 at the high-speed position H and the shifter 26 at the high-speed position H. In the second and fourth speed positions described above, the first friction clutch 9 is operated to the non-transmitting state and the shifter 23 is at its neutral position N and the shifter 31 is at its low-speed position L. In the sixth and eighth speed positions described above, the first friction clutch 9 is operated to the non-transmitting state and the shifter 23 is at its neutral position N and the shifter 31 is at its high-speed position H.

[4]

Next, control scheme of the change-speed operations will be described.

This agricultural tractor provides four change-speed modes of a first change-speed mode, a second change-speed mode, a third change-speed mode and a fourth change-speed mode. One of these first, second, third and fourth change-speed modes may be selected by an operator by operating a setting switch 65 (see FIG. 2).

As shown in FIG. 2, there are provided a change-speed lever 63 operable into one of the first through eighth speed positions and the setting switch 65. And, the operated positions of the change-speed lever 63, an auxiliary change-speed lever 66, the forward/reverse lever 57 and the setting switch 65 are all inputted to a controller 64. As shown in FIGS. 1 and 2, the controller 64 receives also inputs of detection values of a revolution sensor 67 for detecting a revolution of the engine 2 and a further revolution sensor 68 for detecting a revolution of the rotary power transmitted to the rear-wheel differential mechanism 58.

With the above, based on the operated conditions of the change-speed lever 63, an auxiliary change-speed lever 66, the forward/reverse lever 57 and the setting switch 65, the detection values from the revolution sensors 67, 68 and also on the mode selected from the first through fourth change-speed modes, the controller 64 actuates the control valves 39, 40, 41, 42, 60, 61 and 62 thereby to operate the first actuator 35, the first auxiliary actuator 36, the second actuator 37, and the second auxiliary actuator 38, thereby to operate the transmission clutch 6, the first friction clutch 9, and the second friction clutch 12 into the respective transmitting or non-transmitting states thereof.

[First Change-speed Mode (Standard Control Mode)]

The First change-speed mode will be described First.

In this first change-speed mode, if the change-speed lever 63 is operated from a certain operational position (speed position) to another operational position (speed position), the change-speed operation from the operational position (speed position) prior to the operation of the change-speed lever 63 to the further operational position (speed position) into which the change-speed lever 63 has been operated is effected at one time. Specifically, in this first change-speed mode, change-speed operations are carried out in the manners described below in accordance with the operational positions (speed positions) of the change-speed lever 63. And, in this mode, the operated positions of the auxiliary change-speed lever 66 and the forward/reverse lever 57 and the detection values from the revolution sensors 67, 68 are not considered.

Figure 3:
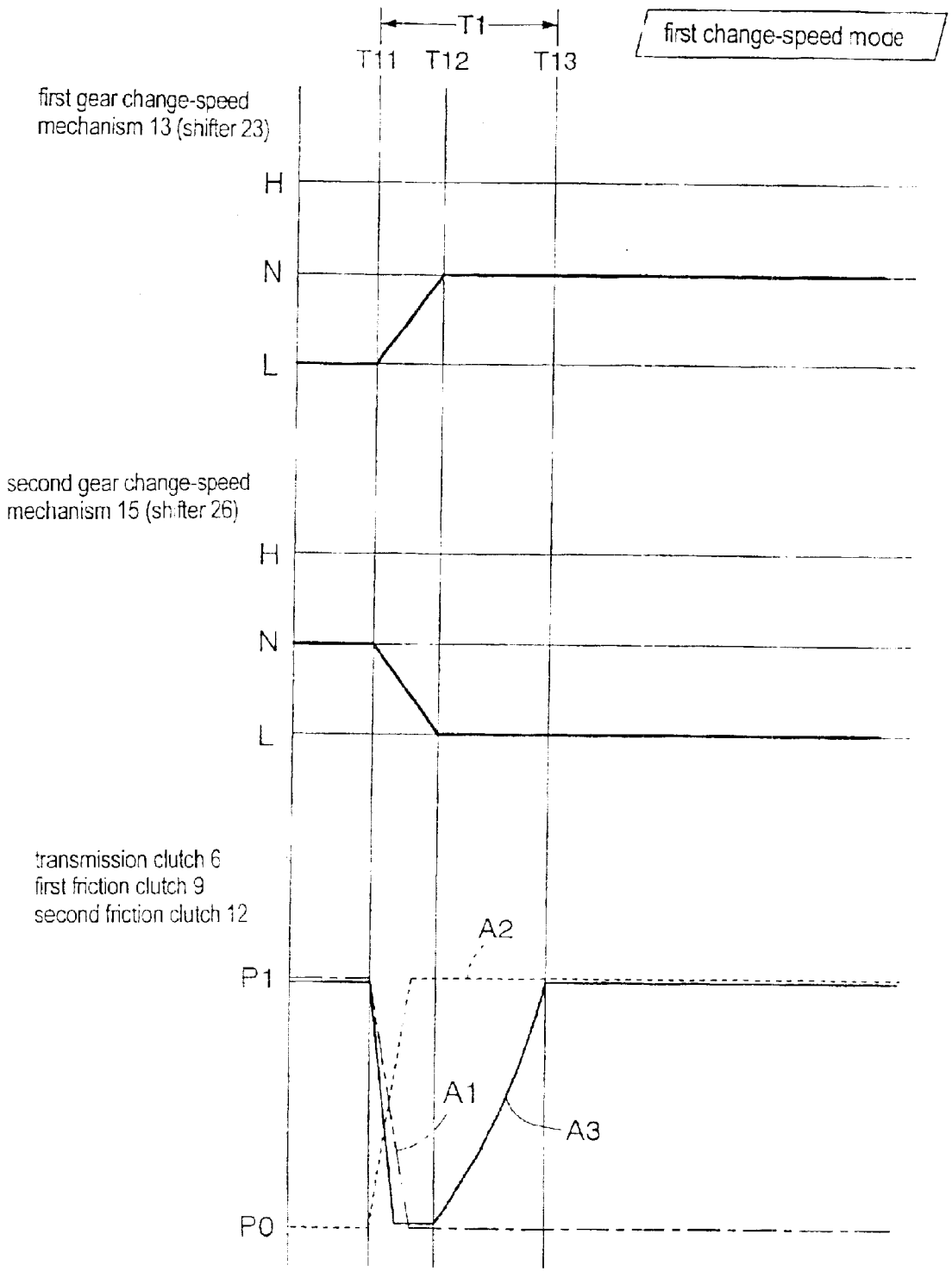
FIG. 3 is a view showing a change-speed operation from a first speed position to a second speed position in a first change-speed mode.

As shown in FIG. 3 and FIG. 7, for example, let us assume that the change-speed lever 63 is operated from the first speed position to the second speed position. When the change-speed lever 63 is at the first speed position, if the shifter 31 is at the low-speed position L, the shifter 23 is at the low-speed position L, the transmission clutch 6 and the first friction clutch 9 are under the transmitting states with a working pressure P1 and if the shifter 34 is at the low-speed position L and the shifter 26 is at the neutral position N, the second friction clutch 12 is operated to the non-transmitting state with a working pressure P0.

As shown in FIG. 3, when the change-speed lever 63 is operated from the first speed position to the second speed position (timing T11), the working pressure of the transmission clutch 6 and the first friction clutch 9 is immediately reduced to the working pressure P0 so that the clutches are operated to the non-transmitting stages (see a solid line A3 and a dotted chain line A1). At the same time, the shifter 23 is operated from the low-speed position L to the neutral position N and the shifter 26 is operated from the neutral position N to the low-speed position N (the shifters 31, 34 are maintained at the low-speed positions L).

As shown in FIG. 3, when the shifter 23 is operated from the low-speed position L to the neutral position N and the shifter 26 is operated from the neutral position N to the low-speed position L (timing T12), the working pressure of the transmission clutch 6 is gradually increased from the working pressure P0 to the working pressure P1 (see a solid line A3) and the transmission clutch 6 is operated to the transmitting stage (timing T13). In the above-described manner, the change-speed operation is completed. In this case, a time period T1 required for one change-speed operation (from the timing T11 to the timing T13) is relatively short.

For instance, if the change-speed lever 63 is operated from the second speed position to the first speed position, as shown in FIG. 7, the shifters 23, 26 are operated (the shifters 31, 34 are maintained at the low-speed positions L), and in addition, in FIG. 3, the states of the first and second friction clutches 9, 12 are reversed, so that the first friction clutch 9 is operated from the non-transmitting state to the transmitting state, whereas the second friction clutch 12 is operated from the transmitting state to the non-transmitting state. And, as illustrated by the solid line A3 in FIG. 3, the pressure reducing operation and the pressure increasing operation of the transmission clutch 6 are effected.

For instance, if the change-speed lever 63 is operated form the first speed position to the third speed position, as shown in FIG. 7, the shifter 23 is operated. But, the shifter 26 is maintained at the neutral position N (the shifters 31 and 34 are maintained at the low-speed positions L). So that, the first friction clutch 9 is maintained at the transmitting state and the second friction clutch 12 is maintained at the non-transmitting state. And, as illustrated by the solid line A3 in FIG. 3, the pressure reducing operation and the pressure increasing operation of the transmission clutch 6 are effected.

For instance, if the change-speed lever 63 is operated form the second speed position to the fourth speed position, as shown in FIG. 7, the shifter 26 is operated. But, the shifter 23 is maintained at the neutral position N (the shifters 31 and 34 are maintained at the low-speed positions L). So that, the first friction clutch 9 is maintained at the non-transmitting state and the second friction clutch 12 is maintained at the transmitting state. And, as illustrated by the solid line A3 in FIG. 3, the pressure reducing operation and the pressure increasing operation of the transmission clutch 6 are effected.

[Second Change-speed Mode (Alternate Control Mode)]
[5]

Figure 4:
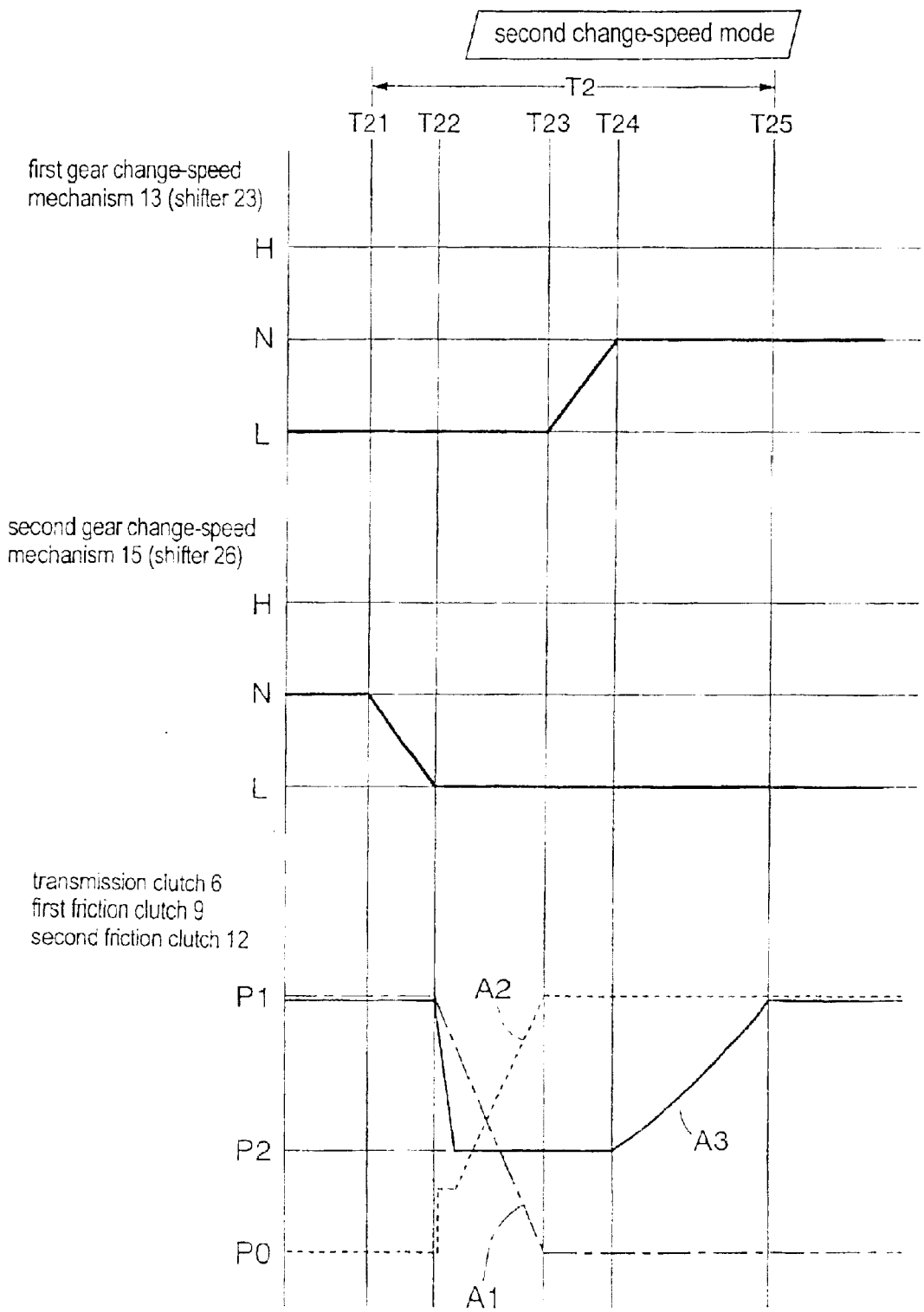
FIG. 4 is a view showing a change-speed operation from a first speed position to a second speed position in a second change-speed mode.

Next, a former half of the second change-speed mode will be described with reference to FIGS. 4, 5 and 7.

In this second change-speed mode, when the change-speed lever 63 is operated from a certain operational position (speed position) to another operational position (speed position), the change-speed operation from the previous operational position (speed position) prior to the operation of the change-speed lever 63 is effected in plurality of steps until reaching the operational position (speed position) in which the change-speed lever 63 has been operated.

For instance, if the change-speed lever 63 is operated from the first speed position to the fifth speed position, a change-speed operation is effected from the first speed position to the second speed position, then another change-speed operation is effected from the second speed position to the third speed position, then still another change-speed operation is effected from the third speed position to the fourth speed position and still another change-speed operation is effected from the fourth speed position to the fifth speed position, finally. Similarly, if, e.g. the change-speed lever 63 is operated from the sixth speed position to the third speed position, a change-speed operation is effected from the sixth speed position to the fifth speed position, then another change-speed operation is effected from the fifth speed position to the fourth speed position and still another change-speed operation is effected from the fourth speed position to the third speed position, finally.

For instance, when the change-speed lever 63 is at the first speed position (i.e. the condition in which the shifter 23 is at the low-speed position L, the shifter 26 is at the neutral position N, the shifters 31, 34 are at the low-speed positions L, the transmission clutch 6 and the first friction clutch 9 are at the transmitting states with the working pressure P1, and the second friction clutch 12 is at the non-transmitting state with the working pressure P0), if the change-speed lever 63 is operated to the fifth speed position (step S0) (timing T21), as describe later in section [11], the working pressure P2 is set (step S1), and the shifter 26 is operated from the neutral position N to the low-speed position N (steps S2, S3) (from timing T21 to timing T22). With this, there is realized a condition in which the shifters 23, 31 are at the first speed position and the shifters 26, 34 are at the second speed position. In this case, the shifter 34 is not operated to the high-speed position H, but maintained at the low-speed position L (pass step S4) (see FIG. 7).

When the shifter 26 is operated to the low-speed position (the condition of the second speed position) (step S3) (timing T22), the working pressure of the transmission clutch 6 is quickly reduced to the working pressure P2 (midway between the working pressures P0 and P1), so that the clutch assumes a semi-transmitting state (step S5) (timing T22) (see the solid line A3). Substantially simultaneously therewith, the working pressure of the second friction clutch 12 is quickly raised from the working pressure P2, so that the clutch is operated to the transmitting state (from timing T22 to timing T23) (see the solid line A2) and the working pressure of the first friction clutch 9 is quickly reduced from the working pressure P1, so that this clutch is operated to the non-transmitting state (step S6) (from timing T22 to timing T23) (see the dotted chain line A1).

With the above, there is realized a dual-transmitting condition in which the power under the condition of the shifters 23, 31 being at the first position is transmitted to the transmission shaft 4 and at the same time the further power under the condition of the shifters 26, 34 is transmitted also to the transmission shaft 4 to be combined with said power. Under this dual-transmitting condition, even if a torque variation occurs, this torque variation can be effectively absorbed by a certain amount of slipping of the transmission clutch 6 under its semi-transmitting state, so that the power with reduced torque variation may be transmitted to the front wheels 53 and the rear wheels 54.

If the second friction clutch 12 is operated to the transmitting state with the working pressure P1 and the first friction clutch 9 is operated to the non-transmitting state with the working pressure P0 (timing T23), the shifter 23 is operated to the neutral position N (step S7) (from timing T23 to timing T24). In this case, the shifter 31 is not operated to the high-speed position, but maintained at the low-speed position L (pass step S8) (see FIG. 7). When the shifter 23 is operated to the neutral position N (timing T24), the working pressure of the transmission clutch 6 is gradually raised from the working pressure P2 to the working pressure P1, so the clutch is operated to the transmitting state (step S9) (from timing T24 to timing T25). In the above-described manner, the change-speed operation from the first speed position to the second speed position is completed.

At step S9, the revolution (traveling speed of the vehicle) of the power transmitted to the rear-wheel differential mechanism 58 is detected by the revolution sensor 68 and inputted to the controller 64, in which the detection value from the revolution sensor 68 undergoes a differential operation to obtain an acceleration of the vehicle. Based on this, the working pressure of the transmission clutch 6 is progressively raised from the working pressure P2 to the working pressure P1 in such a manner as to maintain the acceleration of the vehicle constant (predetermined characteristics) (or to vary the acceleration according to a predetermined characteristics) (from timing T24 to timing T25). In this case, a jerk value may be obtained by the differential processing of the vehicle acceleration and based on this jerk value, the working pressure of the transmission clutch 6 is progressively raised from the working pressure P2 to the working pressure P1 so as to render the clutch into the transmitting state.

[6]

Next, the latter half of the second change-speed mode will be described with reference to FIGS. 4, 5 and 7.

Upon completion of the change-speed operation from the first speed position to the second speed position as described in the foregoing section [5], the process proceeds from step S16 to step S1, so as to set the working pressure P2 as described later in section [11]. And, as the process proceeds from step S2 to step S10, the shifters 23, 31 are operated to the third speed positions with the shifters 26, 34 being at the second speed positions (step S10). In this case, the shifter 31 is not operated to the high-speed position H, but maintained at the low-speed position L (pass step S11) (see FIG. 7). Then, the working pressure of the transmission clutch 6 is quickly reduced to the working pressure P2 (intermediate pressure between the working pressures P0, P1), so that the clutch assumes the semi-transmitting state (step S12). Substantially simultaneously therewith, the working pressure of the first friction clutch 9 is quickly raised from the working pressure P0, so that the clutch is operated into the transmitting state and the working pressure of the second friction clutch 12 is quickly reduced from the working pressure P1, so that this clutch is operated into the non-transmitting state (step S13).

With this, there is realized a dual-transmitting condition in which the power provided under the condition of the shifters 26, 34 being at the second speed positions is transmitted to the transmission shaft 4 and at the same time, the power provided under the condition of the shifters 23, 31 at the third speed positions is transmitted also to the transmission shaft 4 to be combined therewith. Under this dual-transmitting condition, even if a torque variation occurs, this torque variation can be effectively absorbed by slipping of the transmission clutch 6 under its semi-transmitting state, so that the power with reduced torque variation may be transmitted to the front wheels 53 and the rear wheels 54.

When the first friction clutch 9 is operated to the transmitting state with the working pressure P1 and the second friction clutch 12 is operated to the non-transmitting state with the working pressure P0, the shifter 26 is operated to the neutral position N (step S14). In this case, the shifter 34 is not operated to the high-speed position H, but maintained at the low-speed position L (pass step S15) (see FIG. 7). When the shifter 26 is operated to the neutral position N, the working pressure of the transmission clutch 6 is progressively raised from the working pressure P2 to the working pressure P1, so that the clutch is operated into the transmitting state (step S9). In this way, the change-speed operation from the second speed position to the third speed position is complete.

In this case, as described in the foregoing section [5], the working pressure of the transmission clutch 6 is progressively raised from the working pressure P2 to the working pressure P1 in such a manner as to maintain the acceleration of the vehicle constant (predetermined characteristics) (or to vary the acceleration according to a predetermined characteristics).

Upon completion of the change-speed operation from the second speed position to the third speed position described above, then, a further change-speed operation from the third speed position to the fourth speed position with the shifters 23, 31 being at the third speed positions and the shifters 26, 34 being at the fourth speed positions will be effected according to the process described in the foregoing section [5] and steps S1 through S9 is effected (in this case, the shifters 34, 31 are not operated to the high-speed positions H, but maintained at the low-speed positions L (pass steps S4, S8) (see FIG. 7).

Next, a still further change-speed operation from the fourth speed position to the fifth speed position with the shifters 26, 34 being at the fourth speed positions and the shifters 23, 31 being at the fifth speed positions will be effected according to the process described in this section [6] and steps S1, S2, S10–S15 and S9 (in this case, at step S11, the shifter 31 is operated from the low-speed position L to the high-speed position H, and at step S15, the shifter 34 is operated from the low-speed position L to the high-speed position H) (see FIG. 7).

With the above-described repetition of the change-speed operations, the process reaches the operated position (speed position) of the change-speed lever 63. With this, the change-speed operation is completed.

[Third Change-speed Mode (First Skip Change-speed Mode)]

[7]

Next, a former half of the third change-speed mode will be described with reference to FIG. 6 and FIG. 7.

In this third change-speed mode, when the change-speed lever 63 is operated from a certain operational position (speed position) to another operational position (speed position), there is set a first intermediate speed position (or first and second intermediate speed positions) of a transmission ratio which is substantially in the middle of the operational position (speed position) prior to the operation of the change-speed lever 63 and the operational position (speed position) into which the lever 63 has been operated. Then, a change-speed operation is effected first from the operational position (speed position) prior to the operation of the change-speed lever 63 to the first intermediate speed position and then a further change-speed operation is effected from this first intermediate speed position to the further operational position (speed position) into which the lever 63 has been operated (Alternatively, a change-speed operation is effected first from the operational position (speed position) prior to the operation of the change-speed lever 63 to the first intermediate speed position, then a further change-speed operation is effected from this first intermediate speed position to the second intermediate speed position and then a still further change-speed operation is effected from the second intermediate speed position to the further operational position (speed position) into which the lever 63 has been operated.).

If the change-speed lever 63 is operated from a certain operational position (speed position) to another adjacent higher or lower speed position (e.g. if the lever 63 is operated from the first speed position to the second speed position or from the eighth speed position to the seventh speed position, etc.), the process proceeds from steps S21, S22, S23 to steps S24, S25 to set the working pressure P2 as described later in section [11], to effect the change-speed operation to the operated position (speed position) of the change-speed lever 63. In this case, if the previous operational position (speed position) prior to the operation of the change-speed lever 63 is one of the first, third, fifth or seventh speed position, the change-speed operation will be effected according to the process of the foregoing section [5] and steps S3 through S9. Whereas, if the previous operational position (speed position) prior to the operation of the change-speed lever 63 is one of the second, fourth, sixth or eighth speed position, the change-speed operation will be effected according to the process of the foregoing section [6] and steps S10 through S15 and S9.

If the change-speed lever 63 is operated from one of the first, third, fifth and seventh speed position to another of these first, third, fifth and seventh speed position (steps S21, S22), between the previous operational position (speed position) prior to the operation of the change-speed lever 63 and the further operational position (speed position) into which the lever 63 has been operated, from the second, fourth, sixth and eighth speed positions, there is selectively set a first intermediate speed position providing a transmission ratio substantially in the middle thereof (step S26). For instance, if the change-speed lever 63 is operated from the first speed position to the seventh speed position, the fourth speed position is set as the first intermediate speed position.

Similarly, if the change-speed lever 63 is operated from one of the second, fourth, sixth and eighth speed positions to another of these the second, fourth, sixth and eighth speed positions (steps S21, S22), between the previous operational position (speed position) prior to the operation of the change-speed lever 63 and the further operational position (speed position) into which the lever 63 has been operated, from the first, third, fifth and seventh speed position, there is selectively set a first intermediate speed position providing a transmission ratio substantially in the middle thereof (step S26). For instance, if the change-speed lever 63 is operated from the eighth speed position to the second speed position, the fifth speed position is set as the first intermediate speed position.

If the change-speed lever 63 is operated from one of the first, third, fifth and seventh speed positions to one of the second, fourth, sixth and eighth speed positions (excluding the above-described case in which the change-speed lever 63 is operated from a certain operational position (speed position) to another adjacent higher or lower speed position) (steps S21, S22), between the previous operational position (speed position) prior to the operation of the change-speed lever 63 and the further operational position (speed position) into which the lever 63 has been operated, from the second, fourth, sixth and eighth speed positions, there is selected set a first intermediate speed position providing a transmission ratio substantially in the middle thereof and further from the first, third, fifth and seventh speed position, there is selectively set a second intermediate speed position providing a transmission ratio substantially in the middle thereof (step S29). In this case, the second intermediate speed position is closer to the further operational position (speed position) into which the change-speed lever 63 has been operated than the first intermediate speed position is. For instance, if the change-speed lever 63 is operated from the first speed position to the sixth speed position, the third speed position will be selectively set as the first intermediate speed position and the fourth speed position will be selectively set as the second intermediate speed position. Further, if the change-speed lever 63 is operated from the first speed position to the eighth speed position, the fourth speed position will be selectively set as the first intermediate speed position and the fifth speed position will be selectively set as the second intermediate speed position.

If the change-speed lever 63 is operated from one of the second, fourth, sixth and eighth speed positions to one of the first, third, fifth and seventh speed positions (excluding the above-described case in which the change-speed lever 63 is operated from a certain operational position (speed position) to another adjacent higher or lower speed position) (steps S21, S22), between the previous operational position (speed position) prior to the operation of the change-speed lever 63 and the further operational position (speed position) into which the lever 63 has been operated, from the first, third, fifth and seventh speed positions, there is selected set a first intermediate speed position providing a transmission ratio substantially in the middle thereof and further from the second, fourth, sixth and eighth speed positions, there is selectively set a second intermediate speed position providing a transmission ratio substantially in the middle thereof (step S29). In this case, the second intermediate speed position is closer to the further operational position (speed position) into which the change-speed lever 63 has been operated than the first intermediate speed position is. For instance, if the change-speed lever 63 is operated from the eighth speed position to the first speed position, the fifth speed position will be selectively set as the first intermediate speed position and the fourth speed position will be selectively set as the second intermediate speed position.

[8]
Next, the latter half of the third change-speed mode will be described with reference to FIGS. 6 and 7.

As described in the foregoing section [7], when the change-speed lever 63 is operated to set the first intermediate speed position (the first and second intermediate speed positions), the working pressure P2 is set as described in section [11] to be described later (steps S24, S25).

As described in the foregoing section [7], under the condition of the first intermediate speed position being set (step S26), the change-speed operation from the previous operational position (speed) prior to the operation of the change-speed lever 63 to the first intermediate speed position will be effected (step S27). In this case, if the previous operational position (speed position) prior to the operation of the change-speed lever 63 is one of the first, third, fifth or seventh speed position, the change-speed operation will be effected according to the process of the foregoing section [5] and steps S3 through S9. Whereas, if the previous operational position (speed position) prior to the operation of the change-speed lever 63 is one of the second, fourth, sixth or eighth speed position, the change-speed operation will be effected according to the process of the foregoing section [6] and steps S10 through S15 and S9.

Next, as the working pressure P2 is set as described in the section [11] described later (step S28), and the change-speed operation from the first intermediate speed position to the further operational position (speed position) into which the change-speed lever 63 has been operated will be effected (step S34). In this case, if the first intermediate speed position is one of the first, third, fifth or seventh speed position, the change-speed operation will be effected according to the process of the foregoing section [5] and steps S3 through S9. Whereas, if the first intermediate speed position is one of the second, fourth, sixth or eighth speed position, the change-speed operation will be effected according to the process of the foregoing section [6] and steps S10 through S15 and S9.

As described in the foregoing section [7], under the condition of the first intermediate speed position and the second intermediate speed position being set (step S29), the change-speed operation from the previous operational position (speed) prior to the operation of the change-speed lever 63 to the first intermediate speed position will be effected (step S30). In this case, if the previous operational position (speed position) prior to the operation of the change-speed lever 63 is one of the first, third, fifth or seventh speed position, the change-speed operation will be effected according to the process of the foregoing section [5] and steps S3 through S9. Whereas, if the previous operational position (speed position) prior to the operation of the change-speed lever 63 is one of the second, fourth, sixth or eighth speed position, the change-speed operation will be effected according to the process of the foregoing section [6] and steps S10 through S15 and S9.

Next, as the working pressure P2 is set as described in the section [11] described later (step S31), and the change-speed operation from the first intermediate speed position to the second intermediate speed position will be effected (step S32). In this case, if the first intermediate speed position is one of the first, third, fifth or seventh speed position, the change-speed operation will be effected according to the process of the foregoing section [5] and steps S3 through S9. Whereas, if the first intermediate speed position is one of the second, fourth, sixth or eighth speed position, the change-speed operation will be effected according to the process of the foregoing section [6] and steps S10 through S15 and S9.

Next, as the working pressure P2 is set as described in the section [11] described later (step S33), and the change-speed operation from the second intermediate speed position to the further operational position (speed position) into which the change-speed lever 63 has been operated will be effected (step S34). In this case, if the second intermediate speed position is one of the first, third, fifth or seventh speed position, the change-speed operation will be effected according to the process of the foregoing section [5] and steps S3 through S9. Whereas, if the second intermediate speed position is one of the second, fourth, sixth or eighth speed position, the change-speed operation will be effected according to the process of the foregoing section [6] and steps S10 through S15 and S9.

[Fourth Change-speed Mode (Second Skip Change-speed Mode)]

[9]

In this fourth change-speed mode, like the third change-speed mode described in the foregoing sections [7], [8], a first intermediate speed position (or first and second intermediate speed positions) is set. However, this first intermediate speed position (or the first and second intermediate speed positions) is different from that of the third change-speed mode as described below.

In the fourth change-speed mode, when the change-speed lever 63 is operated from a certain operational position (speed position) to another operational position (speed position), the first intermediate speed position (or the first and second intermediate speed positions) is (are) set slightly closer to the previous operational position (speed position) prior to the operation of the change-speed lever 63 than to the further operational position (speed position) into which the lever 63 has been operated. And, from the previous operational position (speed position) prior to the operation of the change-speed lever 63, the setting operation of the working pressure P2 described later in section [11] and a change-speed operation to the first intermediate speed position will be effected. And, from this first intermediate speed position, the setting operation of the working pressure P2 described later in section [11] and a change-speed operation to the second intermediated speed position will be effected. Then, from this second intermediate speed position, the setting operation of the working pressure P2 described later in section [11] and a change-speed operation to the further operational position (speed position) into which the lever 63 has been operated will be effected.

If the change-speed lever 63 is operated from a certain operational position (speed position) to another adjacent higher or lower speed position (e.g. if the lever 63 is operated from the first speed position to the second speed position or from the eighth speed position to the seventh speed position, etc.), like the third change-speed mode (see the foregoing section [7]), the setting operation of the working pressure P2 described later in section [11] and a change-speed operation to the further operational position (speed position) into which the change-speed lever 63 has been operated will be effected. In this case, if the previous operational position (speed position) prior to the operation of the change-speed lever 63 is one of the first, third, fifth or seventh speed position, the change-speed operation will be effected according to the process of the foregoing section [5] and steps S3 through S9. Whereas, if the previous operational position (speed position) prior to the operation of the change-speed lever 63 is one of the second, fourth, sixth or eighth speed position, the change-speed operation will be effected according to the process of the foregoing section [6] and steps S10 through S15 and S9.

If the change-speed lever 63 is operated from one of the first, third, fifth and seventh speed position to another of these first, third, fifth and seventh speed position, from the second, fourth, sixth and eighth speed positions, there is selectively set a first intermediate speed position slightly closer to the previous operational position (speed position) prior to the operation of the change-speed lever 63 than to the further operational position (speed position) into which the lever 63 has been operated. For instance, if the change-speed lever 63 is operated from the first speed position to the seventh speed position, the sixth speed position is set as the first intermediate speed position.

Similarly, if the change-speed lever 63 is operated from one of the second, fourth, sixth and eighth speed positions to another of these second, fourth, sixth and eighth speed positions, from the first, third, fifth and seventh speed position, there is selectively set a first intermediate speed position slightly closer to the previous operational position (speed position) prior to the operation of the change-speed lever 63 than to the further operational position (speed position) into which the lever 63 has been operated. For instance, if the change-speed lever 63 is operated from the eighth speed position to the second speed position, the third speed position is set as the first intermediate speed position.

If the change-speed lever 63 is operated from one of the first, third, fifth and seventh speed positions to one of the second, fourth, sixth and eighth speed positions (excluding the above-described case in which the change-speed lever 63 is operated from a certain operational position (speed position) to another adjacent higher or lower speed position), from the second, fourth, sixth and eighth speed positions, there is selected set first intermediate speed position slightly closer to the previous operational position (speed position) prior to the operation of the change-speed lever 63 than to the further operational position (speed position) into which the lever 63 has been operated, and further from the first, third, fifth and seventh speed position, there is selectively set a second intermediate speed position slightly closer to the previous operational position (speed position) prior to the operation of the change-speed lever 63 than to the further operational position (speed position) into which the lever 63 has been operated. In this case, the second intermediate speed position is closer to the further operational position (speed position) into which the change-speed lever 63 has been operated than the first intermediate speed position is. For instance, if the change-speed lever 63 is operated from the first speed position to the eighth speed position, the sixth speed position will be selectively set as the first intermediate speed position and the seventh speed position will be selectively set as the second intermediate speed position.

If the change-speed lever 63 is operated from one of the second, fourth, sixth and eighth speed positions to one of the first, third, fifth and seventh speed positions (excluding the above-described case in which the change-speed lever 63 is operated from a certain operational position (speed position) to another adjacent higher or lower speed position), from the first, third, fifth and seventh speed positions, there is selected set first intermediate speed position slightly closer to the previous operational position (speed position) prior to the operation of the change-speed lever 63 than to the further operational position (speed position) into which the lever 63 has been operated, and further from the second, fourth, sixth and eighth speed positions, there is selectively set a second intermediate speed position slightly closer to the previous operational position (speed position) prior to the operation of the change-speed lever 63 than to the further operational position (speed position) into which the lever 63 has been operated. In this case, the second intermediate speed position is closer to the further operational position (speed position) into which the change-speed lever 63 has been operated than the first intermediate speed position is. For instance, if the change-speed lever 63 is operated from the eighth speed position to the first speed position, the third speed position will be selectively set as the first intermediate speed position and the second speed position will be selectively set as the second intermediate speed position.

As described above, with the setting of the first intermediate speed position (or the first and second intermediate speed positions), like the third change-speed mode described in the foregoing section [8] and illustrated in FIG. 6, the setting operation of the working pressure P2 described later in section [11] and a change-speed operation to the first intermediate speed position will be effected. And, from this first intermediate speed position, the setting operation of the working pressure P2 described later in section [11], a change-speed operation to the operated position (speed position) of the change-speed lever 63 will be effected. And, from the previous position (speed position) prior to the operation of the change-speed lever 63, the setting operation of the working pressure P2 described later in section [11] and a change-speed operation to the second intermediate speed position will be effected. And, from this second intermediate speed position, the setting operation of the working pressure P2 described later in section [11] and a change-speed operation to the operated position (speed position) of the change-speed lever 63 will be effected.

[10]

Next, there will be described a case when the forward/reverse lever 57 is operated.

As described in the foregoing section [2], in the forward/reverse switchover mechanism 44, as shown in FIG. 2, the forward/reverse lever 57 is mechanically linked to the shifter 52. And, the operated position of the forward/reverse lever 57 is inputted to the controller 64. The shifter is slid to a forward drive position F or a reverse drive position R by operating the forward/reverse lever 57.

With this, when an operation for operating the forward/reverse lever 57 from the forward drive position F to the reverse drive position R (or from the reverse drive position R to the forward drive position F) is initiated, like the latter half (of the first change-speed mode) described in the foregoing section [4], the working pressure of the transmission clutch 6 is automatically reduced as shown by the solid line A3 in FIG. 3, so that the clutch is operated into the non-transmitting state. And, when the forward/reverse lever 57 is operated to the reverse drive position R (or the forward drive position F), the working pressure of the transmission clutch 6 is automatically raised progressively, so that the clutch is operated into the transmitting state.

For this transmission clutch 6 alone, there is provided a clutch pedal (not shown) which can be manually operated. And, the operated position of this clutch pedal is inputted to the controller 64. With this, when the clutch pedal is depressed by a foot, the controller 64 and the control valve 60 operate the transmission clutch 6 into its non-transmitting state. When the clutch pedal is released, the controller 64 and the control valve 60 operate the transmission clutch 6 into its transmitting state.

[11]

Next, the setting operations of the working pressure P2 at the step S1 of the foregoing sections [5] through [9] and FIG. 5, and the steps S24, S25, S28, S31, S33 in FIG. 6 will be described with reference to FIG. 8.

As shown in step S0 in FIG. 5 and steps S22, S23 in FIG. 6, when the operation of the change-speed lever 63 is started, the revolution of the engine 1 at this very moment is detected by the revolution sensor 67 and this detected revolution (current revolution of the engine 1) is compared with a revolution of the engine 1 under zero-load condition, thereby to obtain a revolution difference N (step S41).

Then, based on this revolution difference N, the working pressure P2 is set. Specifically, if the revolution difference N is large, this is interpreted as a large load being applied to the vehicle. Hence, the working pressure P2 will be set to a relatively high value. If the revolution difference N is small, this is interpreted as a small load being applied to the vehicle. Hence, the working pressure P2 will be set to a relatively low value. (step S42). In the case of an agricultural tractor, in general, a desired traveling speed of the vehicle is obtained by operating the change-speed lever 63 and the auxiliary change-speed lever 66 with an accelerator lever (not shown) being set to its full-open position. Therefore, the above-described revolution of the engine under the zero lead condition means a revolution of the engine 1 under the condition in which the accelerator lever is operated to the full-open position.

The operated position (speed position) of the auxiliary change-speed lever 66 is detected. And, if it is detected that the auxiliary change-speed lever 66 is set to the high-speed position H, this is interpreted as the road run of the vehicle (step S43). Then, the working pressure P2 set at step S42 is adjusted to a slightly lower speed side (step S44). Conversely, if it is detected that the auxiliary change-speed lever 66 is set at the first or second low-speed position L1, L2, this is interpreted as the working run of the vehicle (step S43). Then, the working pressure P2 set at step S42 is adjusted to a slightly higher speed side (step S45).

When the auxiliary change-speed lever 66 is set at the high-speed position H (steps S43, S44), if the forward/reverse lever 57 is set at the forward drive position F (step S46), the working pressure P2 set at step S42 is adjusted to a slightly higher speed side (step S47). Whereas, if the forward/reverse lever 57 is set at the reverse drive position R (step S46), the working pressure P2 set at step S42 is adjusted to a slightly lower speed side (step S48).

When the auxiliary change-speed lever 66 is set at the first or second low-speed position L1, L2 (steps S43, S45), if the forward/reverse lever 57 is set at the forward drive position F (step S49), then, the operated position (speed position) of the change-speed lever 63 is detected (step S50). Then, based on this detected operated position of the change-speed lever 63, the working pressure P2 set at step S42 is adjusted (step S51). In this case, the higher position is detected at step S51 as the operated position (speed position) of the change-speed lever 63, the higher side the working pressure P2 set at step S45 will be adjusted to. Conversely, the lower position is detected at step S51 as the operated position (speed position) of the change-speed lever 63, the lower side the working pressure P2 set at step S45 will be adjusted to.

When the auxiliary change-speed lever 66 is set at the first or second low-speed position L1, L2 (steps S43, S45), if the forward/reverse lever 57 is set at the reverse drive position R (step S49), then, the working pressure P2 set at step S45 will be adjusted to a slightly lower side (step S52).

As described above, the working pressure P2 is set, in accordance with the revolution difference N between the revolution of the engine 1 under the zero load condition and a detected revolution of the engine 1 (current revolution of the engine 1), the operated position (speed position) of the change-speed lever 63, the operated position (speed position) of the auxiliary change-speed lever 66 and the operated position of the forward/reverse lever 57. Therefore, the working pressures P2 set respectively at step S1 of FIG. 5, and at steps S24, S25, S28, S31, S33 of FIG. 6 will be slightly different from each other.

[Modified Constructions of the Invention]

[A-1]

In place of steps S41, S42 in FIG. 8, upon an operation of the change-speed lever 63, a resultant reduction ratio in the traveling speed of the vehicle at this very moment may be calculated based on the detection value from the revolution sensor 68 and the working pressure P2 may be set based on this reduction ratio in the traveling speed of the vehicle. In this case, if the reduction ratio in the traveling speed of the vehicle is large, this is interpreted as a large load being applied to the vehicle, so that the working pressure P2 will be set to a higher value. Conversely, if the reduction ratio in the traveling speed of the vehicle is small, this is interpreted as a small load being applied to the vehicle, so that the working pressure P2 will be set to a lower value.

[A-2]

The steps S41 through S52 of FIG. 8 may be omitted. Instead, a manually operable dial switch (not shown) may be provided for allowing an operator to manually set the working pressure P2. Like this case, when the working pressure P2 is not calculated and set for each change-speed operation, the flowcharts of FIGS. 5 and 6 described above will be modified as flowcharts of FIGS. 9 and 10, respectively.

[A-3]

As shown in step S9 of FIG. 5, in the case of the construction for progressively raising the working pressure of the transmission clutch 6 from the working pressure P2 to the working pressure P1 for operating the clutch into the transmitting state in such a manner as to maintain the acceleration of the vehicle constant (predetermined characteristics) (or to vary it according to the predetermined characteristics), a manually operable dial switch (not shown) may be provided for allowing an operator to manually set or adjust the acceleration of the vehicle (predetermined characteristics of the acceleration of the vehicle) to be maintained constant.

[A-4]

In the first change-speed mode described above, when the change-speed lever 63 is operated from one of the first, third, fifth and seventh speed positions to one of the second, fourth, sixth and eighth speed positions, like the second change-speed mode, the change-speed mode may be effected according to steps S3 through S9 of FIG. 5. Similarly, when the change-speed lever 63 is operated from one of the second, fourth, sixth and eighth speed positions to one of the first, third, fifth and seventh speed positions, like the second change-speed mode, the change-speed mode may be effected according to steps S10 through S15 and S9 of FIG. 5.

[B-1]

The setting switch 65 may be omitted and the construction may be modified as follows.

A revolution sensor (not shown) for detecting a revolution of the engine 1 is provided for obtaining a difference between the detected revolution of the engine 1 and a revolution of the engine 1 under zero load condition. In the case of an agricultural tractor, in general, a desired traveling speed of the vehicle is obtained by operating the change-speed lever 63 and the auxiliary change-speed lever (not shown) with an accelerator lever (not shown) being set to its full-open position. Therefore, the above-described revolution of the engine under the zero lead condition means a revolution of the engine 1 under the condition in which the accelerator lever is operated to the full-open position.

Then, if the revolution difference is below a predetermined value, this is interpreted as a small traveling load being applied to the vehicle, so that the first change-speed mode is automatically selected. Conversely, if the revolution difference is above the predetermined value, this is interpreted as a large traveling load being applied to the vehicle, so that the second change-speed mode is automatically selected. In this case, the construction may be further modified such that the third change-speed mode or the fourth change-speed mode is automatically selected instead of the second change-speed mode.

[B-2]

The setting switch 65 may be omitted and the construction may be further modified as follows.

A hitch (not shown) is provided at the rear of the vehicle body for connecting the implement, the cart or the like for towing it. And, a towing load sensor (not shown) is provided for detecting a towing load applied to the hitch.

Then, if the towing load is below a predetermined value, the first change-speed mode is automatically selected. Conversely, if the towing load is above the predetermined value, the second change-speed mode is automatically selected. In this case, the construction may be further modified such that the third change-speed mode or the fourth change-speed mode is automatically selected instead of the second change-speed mode.

[B-3]

The setting switch 65 may be omitted and the construction may be further modified as follows.

With an agricultural tractor, to a top link (not shown) and a lower link (not shown) provided at the rear of the vehicle body, a rotary plow (not shown) (an example of the ground-work implement) may be connected for effecting a plowing work or a plow (not shown) (another example of the ground-work implement) may be connected for effecting a drafting work for leveling the ground surface. As the plowing work and the drafting work differ in the modes of the operations, when an operator manually operates an operation switch (not shown), the plowing work mode (rotary plow) or the drafting work mode (plow) will be selected.

Then, in the case of the plowing work mode, the plowing depth of the rotary plow implement will be detected. And, the rotary plow implement will be automatically lifted up or down relative to the vehicle body so as to maintain the plowing depth constant. In this case, the towing load applied to the vehicle will be relatively small (i.e. the rotation of the rotary pawls of the rotary plow implement tends to propel the vehicle body forward).

On the other hand, in the case of the drafting work mode, the towing load applied to the lower link will be detected. Then, the plow implement will be automatically lifted up or down relative to the vehicle body so as to maintain the towing load constant. In this case, the towing load applied to the vehicle (lower link) will be relatively large.

Then, the construction may be provided as follow. Namely, with an operation of a work mode switch, if a disengaged condition for disabling both the plowing work mode and the drafting work mode or the plowing work mode is selected, the first change-speed mode will be automatically selected. Whereas, if the drafting work mode is selected with an operation of the work mode switch, the section change-speed mode will be automatically selected. In this case, the construction may be further modified such that the third change-speed mode or the fourth change-speed mode is automatically selected instead of the second change-speed mode.

[B-4]

The setting switch 65 may be omitted and the construction may be further modified as follows.

In this case, if the auxiliary change-speed lever for operating the auxiliary change-speed mechanism 46 shown in FIG. 1 is operated to the high-speed position, this is interpreted as the traveling-speed of the vehicle being high. Then, the first change-speed mode will be automatically selected. Conversely, if the auxiliary change-speed lever is operated to the middle-speed or low-speed position, this is interpreted as the traveling speed of the vehicle being low. Then, the second change-speed mode will be automatically selected. In this case, the construction may be further modified such that the third change-speed mode or the fourth change-speed mode is automatically selected instead of the second change-speed mode.

[B-5]

The setting switch 65 may be omitted and the construction may be further modified as follows.

The agricultural tractor may include a lift arm (not shown) pivotable up and down by means of a hydraulic cylinder, thereby to lift up and down the lower link (in the plowing work mode and the drafting work mode described above, the rotary plow implement and the plow implement are lifted up and down by the lift arm).

As described hereinbefore, in case the ground-work implement such as the rotary plow or the plow is connected to the top link and the lower link, when no ground-work is to be effected such as in the case of the road run, the ground-work implement will be lifted up far away from the ground relative to the vehicle body. In this case, it may be judged that the traveling load applied to the vehicle is relatively small.

Conversely, if the ground-work implement is significantly lowered relative to the vehicle body, this often means that the vehicle is to effect a work by the ground-work implement. In this case, it may be judged that the traveling load applied to the vehicle is relatively large.

Then, the construction may be modified as follows. Namely, the height or altitude of the ground-work implement relative to the vehicle body is detected (e.g. a vertical angle of the lift arm or the lower link relative to the vehicle body is detected as the height of the ground-work implement relative to the vehicle body). If the height of the ground-work implement relative to the vehicle body is above a predetermined value, the first change-speed mode is automatically selected. Conversely, if the height of the ground-work implement relative to the vehicle body is below the predetermined value, the second change-speed mode is automatically selected. In this case, the construction may be further modified such that the third change-speed mode or the fourth change-speed mode is automatically selected instead of the second change-speed mode.

[D-1]

Figure 11:
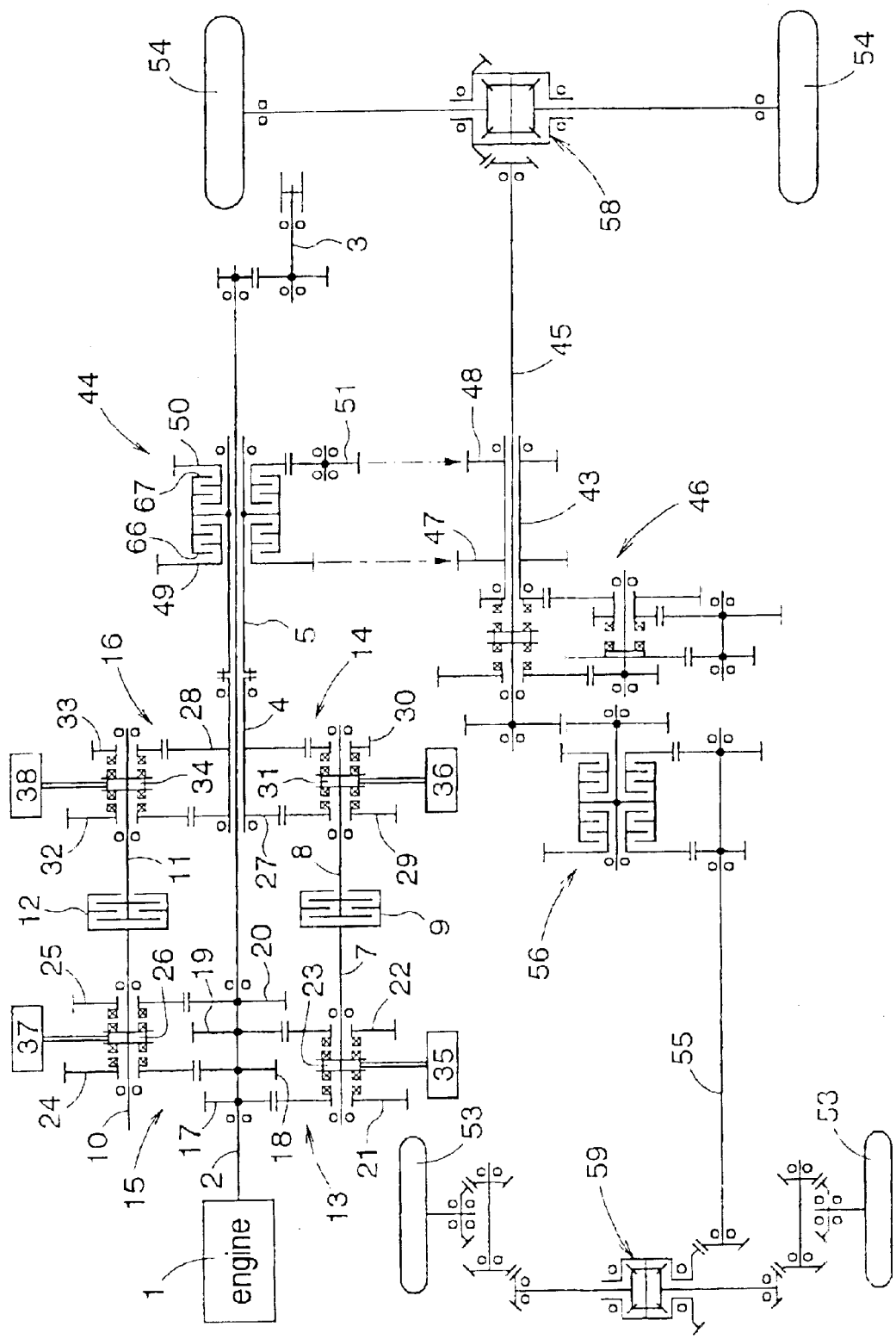
FIG. 11 is a schematic view showing a construction of a further transmission to which the present invention is to be applied.

In place of the construction shown in FIG. 1, the transmission to which the present invention is applied may be modified as shown in FIG. 11.

As shown in FIG. 11, in this construction, the transmission clutch 6 (see FIG. 1) is omitted, and the transmission shaft 4 and the transmission shaft 5 are connected. A transmission shaft 43 fixedly mounts a forward gear 47 and a reverse gear 48. The forward gear 47 meshes with a forward gear 49 rotatably mounted on the transmission shaft 5 an the reverse ger 48 meshes via an intermediate gear 51 with a reverse gear 50 rotatably mounted on the transmission shaft 5. Between the forward gear 49 and the transmission shaft 5, there is provided a hydraulic multiple-disc friction type forward clutch 66. Between the reverse gear 50 and the transmission shaft 5, there is provided a hydraulic multiple-disc friction type reverse clutch 67. These together constitute a forward/reverse switchover mechanism 44. Like the transmission clutch 6, the forward and reverse clutches 66, 67 each is operable into a transmitting state in response to supply of a working fluid thereto and operable into a non-transmitting state in response to discharge of the working fluid therefrom. In this construction, the shifter 52 shown in FIG. 1 is omitted. And, the operated position of the forward/reverse lever 57 is inputted to the controller 64.

With the above, when the forward/reverse lever 57 is operated to the forward drive position F, the forward clutch 66 is operated into the transmitting state and the reverse clutch 67 is operated into the non-transmitting state. On the other hand, when the forward/reverse lever 57 is operated to the reverse drive position R, the reverse clutch 67 is operated into the transmitting state and the forward clutch 66 is operated into the non-transmitting state.

Under the condition of the forward/reverse lever 57 being set at the forward drive position F (i.e. the condition of the forward clutch 66 being under the transmitting state and the reverse dutch 67 being under the non-transmitting state), instead of the transmission clutch 6, the forward clutch 66 is operated. Under the condition of the forward/reverse lever 57 being set at the reverse drive position R (i.e. the condition of the reverse clutch 67 being under the transmitting state and the forward clutch 66 being under the non-transmitting state), instead of the transmission clutch 6, the reverse clutch 67 is operated.

For the forward and reverse clutches 66, 67, there is provided a clutch pedal (not shown) which can be manually operated by being stepped on. With this, under the condition of the forward/reverse lever 57 being at the forward drive position F (i.e. the condition of the forward clutch 66 being under the transmitting state and the reverse clutch 67 being under the non-transmitting state), if the clutch pedal is stepped on, the forward clutch 66 is operated into the non-transmitting state. And, when the clutch pedal is released, the forward clutch 66 is operated back into the transmitting state. Under the condition of the forward/reverse lever 57 being at the reverse drive position R (i.e. the condition of the reverse clutch 67 being under the transmitting state and the forward clutch 66 being under the non-transmitting state), if the clutch pedal is stepped on, the reverse clutch 67 is operated into the non-transmitting state. And, when the clutch pedal is released, the reverse clutch 67 is operated back into the transmitting state.

Further, a first gear change-speed mechanism 13 may be interposed between a first auxiliary transmission shaft 8 and the transmission shaft 4. And, a first auxiliary gear change-speed mechanism 14 may be interposed between a main transmission shaft 7 and the transmission shaft 2. And, a second gear change-speed mechanism 15 may be interposed between a second auxiliary transmission shaft 11 and the transmission shaft 4 and a second auxiliary gear change-speed mechanism 16 may be interposed between a second main transmission shaft 10 and the transmission shaft 2.

[D-2]

Figure 12:
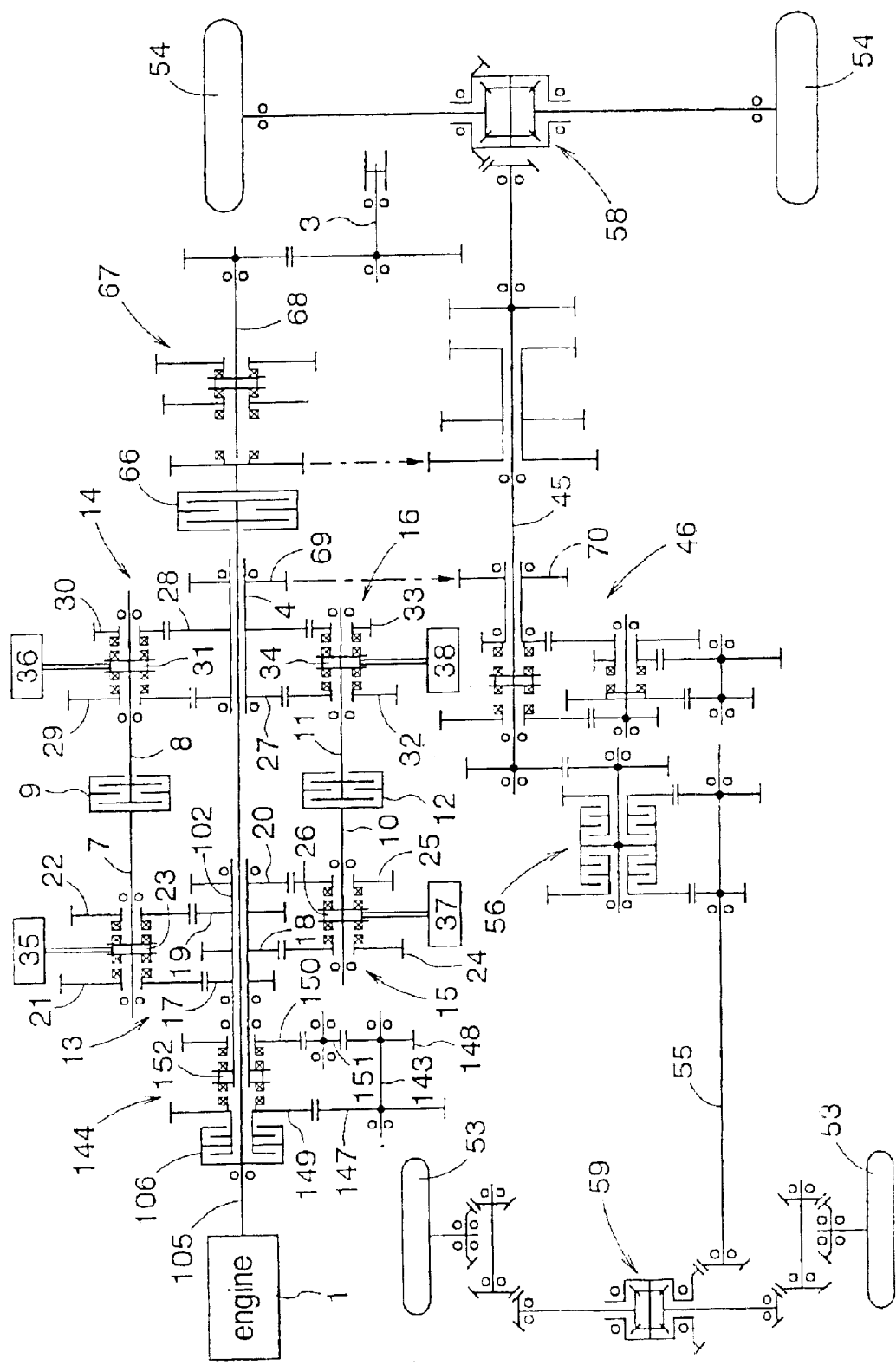
FIG. 12 is a schematic view showing a construction of a still further transmission to which the present invention is to be applied.

In place of the constructions shown in FIGS. 1 and 11, the transmission to which the present invention is applied may be modified as shown in FIG. 12.

FIG. 12 also shows a traveling transmission system for an four-wheel-drive agricultural tractor as an example of the work vehicle. The power of the engine 1 is transmitted to a transmission shaft 105 and transmitted also via a multiple-disc type PTO clutch 66, a PTO change-speed mechanism 67 and a transmission shaft 68 to a PTO shaft 3. The PTO change-speed mechanism 67 is operable, by a sliding operation of a shifter, into a high-speed position, a middle-speed position or a low-speed position.

As shown in FIG. 12, tubular transmission shafts 102, 4 are rotatably mounted on the transmission shaft 105. And, between the transmission shaft 105 and the transmission shaft 102, there is provided a forward/reverse switchover mechanism 144 of the synchromesh type. The transmission shaft 105 rotatably mounts a forward gear 149 and the transmission shaft 102 rotatably mounts a reverse gear 150. The forward gear 149 meshes with a transmission gear 147 fixedly mounted on a transmission shaft 143. The reverse gear 150 meshes via an intermediate gear 151 with a transmission gear 148 fixedly mounted on the transmission shaft 143. A shifter 152 is splined on the transmission shaft 102 to be rotatable therewith and sidably relative thereto. These together constitute the forward/reverse switchover mechanism 144.

As shown in FIG. 12, between the transmission shaft 5 and the forward gear 149, there is provided a hydraulic multiple-disc friction type transmission clutch 106. This transmission clutch 106 is operable into a transmitting state in response to supply of a working fluid thereto and operable into a non-transmitting state in response to discharge of the working fluid therefrom.

As shown in FIG. 12, in the forward/reverse switchover mechanism 144, a forward/reverse lever 57 (see FIG. 2) is mechanically linked to the shifter 152. Then, by operating the forward/reverse lever 57 to the forward drive position F or the reverse drive position R, the shifter 152 is slid to mesh with the forward gear 149 and the reverse gear 150. When the shifter 152 is meshed with the forward gear 149, the power of the transmission clutch 106 is transmitted in the forward drive condition directly to the transmission shaft 102. When the shifter 152 is meshed with the reverse gear 150, the power of the transmission shaft 106 is transmitted via the forward gear 149, the transmission gear 147, the transmission shaft 143, the transmission gear 148, the intermediate gear 151 and the reverse gear 150 to the transmission shaft 102 in the forward drive condition.

As shown in FIG. 12, in parallel with the transmission shafts 102, 4, a first main transmission shaft 7 and a first auxiliary transmission shaft 8 are disposed. Between these first main and auxiliary transmission shafts 7, 8, there is provided a first friction clutch 9. In parallel with the transmission shafts 102, 4, a second main transmission shaft 10 and a second auxiliary transmission shaft 11 are disposed. Between these second main and auxiliary transmission shafts 10, 11, there is provided a second friction clutch 12. Each of these first and second friction clutches 9, 12 is a multiple-disc friction type clutch, which is operable into a transmitting state in response to supply of a working fluid thereto and operable into a non-transmitting state in response to discharge of the working fluid therefrom.

As also shown in FIG. 12, between the transmission shaft 102 and the first main transmission shaft 7, there is provided a first gear change-speed mechanism 13 of the synchromesh type. And, between the transmission shaft 102 and the second main transmission shaft 10, there is provided a second gear change-speed mechanism 15 of the synchromesh type. The transmission shaft fixedly mounts a first gear 17, a second gear 18, a third gear 19 and a fourth gear 20. The first main transmission shaft 7 rotatably mounts a low-speed gear 21 and a high-speed gear 22, which mesh with the first gear 17 and the third gear 19. A shifter 23 is splined to the first main transmission shaft 7 to be rotatable therewith and slidable relative thereto. These together constitute the first gear change-speed mechanism 13. The second main transmission shaft 10 rotatably mounts a low-speed gear 24 and a high-speed gear 25, which mesh with the second gear 18 and the fourth gear 20. A shifter 26 is splined to the second main transmission shaft 10 to be rotatable therewith and slidable relative thereto. These together constitute the second gear change-speed mechanism 15.

As also shown in FIG. 12, between the transmission shaft 4 and the first auxiliary transmission shaft 8, there is provided a first auxiliary gear change-speed mechanism 14 of the synchromesh type. And, between the transmission shaft 4 and the second auxiliary transmission shaft 11, there is provided a second auxiliary gear change-speed mechanism 16 of the synchromesh type. The transmission shaft 4 fixedly mounts a low-speed gear 27 and a high-speed gear 28. The first auxiliary transmission shaft 8 rotatably mounts a low-speed gear 29 and a high-speed gear 30, which mesh with the low-speed gear 27 and the high-speed gear 28. A shifter 31 is splined to the first auxiliary transmission shaft 8 to be rotatable therewith and slidable relative thereto. These together constitute the first auxiliary gear change-speed mechanism 14. The second auxiliary transmission shaft 11 rotatably mounts a low-speed gear 32 and a high-speed gear 33, which mesh with the low-speed gear 27 and the high-speed gear 28. A shifter 34 is splined to the second auxiliary transmission shaft 11 to be rotatable therewith and slidable relative thereto. These together constitute the second auxiliary gear change-speed mechanism 16.

With the above-described construction, there are realized a condition in which the power of the transmission shaft 102 is transmitted via the first main and auxiliary transmission shafts 7, 8 to the transmission shaft 4 (the transmitting state of the first friction clutch 9) and a further condition in which the power of the transmission shaft 102 is transmitted via the second main and auxiliary transmission shafts 10, 11 to the transmission shaft 4 (the transmitting state of the second friction clutch 12).

As shown in FIG. 12, in the case of the condition in which the power of the transmission shaft 102 is transmitted via the first main and auxiliary transmission shafts 7, 8 to the transmission shaft 4 (the transmitting state of the first friction clutch 9), the power of the transmission shaft 102 is transmitted via the first gear change-speed mechanism 13, the first main transmission shaft 7, the first friction clutch 9, the first auxiliary transmission shaft 8 and the first auxiliary gear change-speed mechanism 14 to the transmission shaft 4 in four speeds (the first speed position, the third speed position, the fifth speed position and the seventh speed position).

As shown in FIG. 12, in the case of the further condition in which the power of the transmission shaft 102 is transmitted via the second main and auxiliary transmission shafts 10, 11 to the transmission shaft 4 (the transmitting state of the second friction clutch 12), the power of the transmission shaft 102 is transmitted via the second gear change-speed mechanism 15, the second main transmission shaft 10, the second friction clutch 12, the second auxiliary transmission shaft 11 and the second auxiliary gear change-speed mechanism 16 to the transmission shaft 4 in four speeds (the second speed position, the fourth speed position, the sixth speed position and the eighth speed position).

For this transmission system too, the control apparatus functions in the same manners as described hereinbefore.

[D-3]

Figure 13:
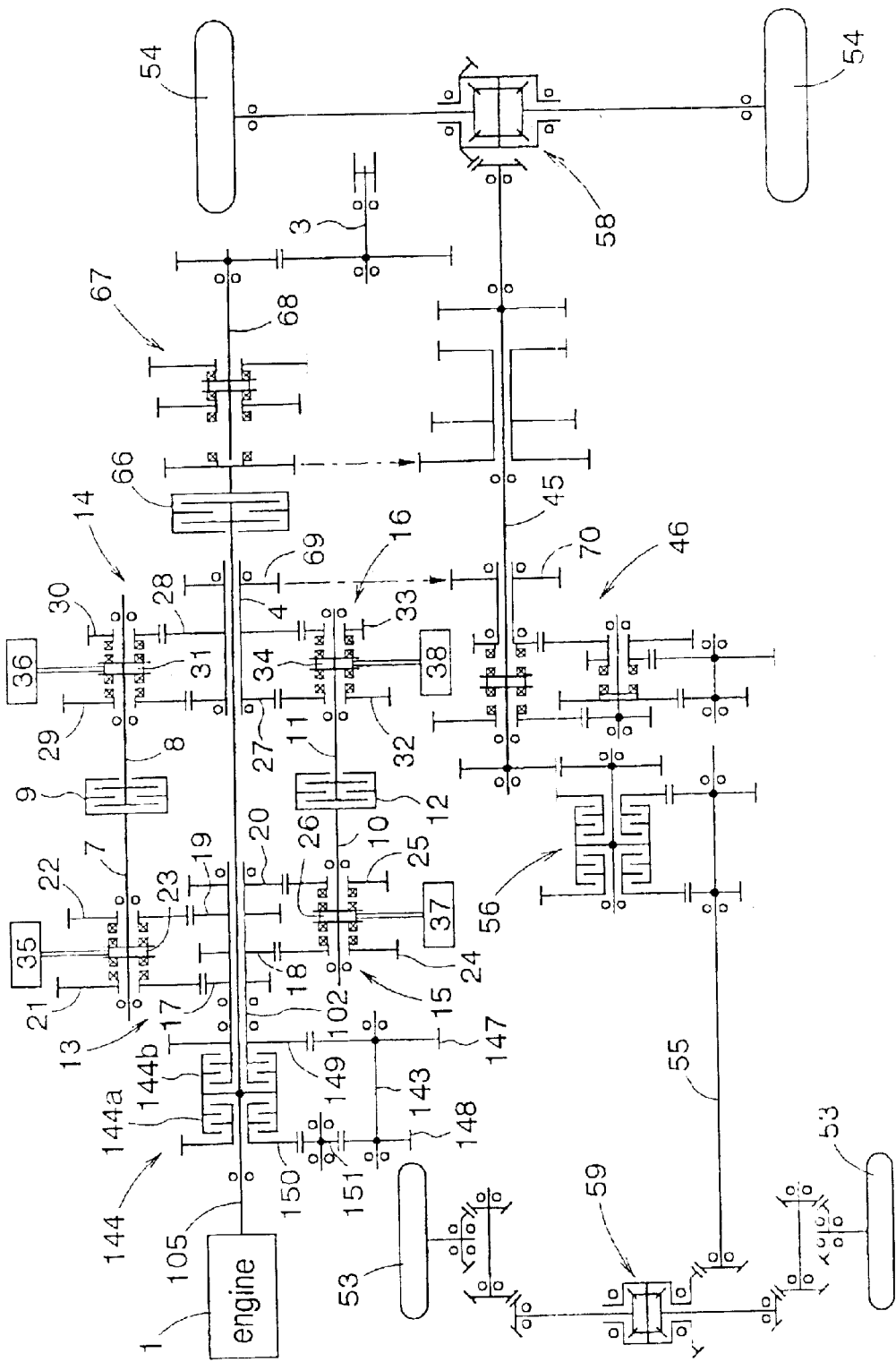
FIG. 13 is a schematic view showing a construction of a still further transmission to which the present invention is to be applied.

A variation of the transmission system of FIG. 12 is shown in FIG. 13.

In this transmission system shown in FIG. 13, the transmission clutch 6 (see FIG. 12) is omitted. The transmission shaft 102 fixedly mounts a forward gear 149. The transmission shaft 105 rotatably mounts a reverse gear 150. The forward gear 149 meshes with a transmission gear 147 fixedly mounted on the transmission shaft 143. The reverse gear 150 meshes via an intermediate gear 151 with a transmission gear 148 fixedly mounted on the transmission shaft 143. Between the transmission shaft 105 and the transmission shaft 102, there is provided a hydraulic multiple-disc friction type forward clutch 144*a*. Between the transmission shaft 105 and the reverse gear 150, there is provided a hydraulic multiple-disc friction type reverse clutch 144b. These together constitute a forward/reverse switchover mechanism 144. Each of the forward and reverse clutches 144a, 144b is operable into a transmitting state in response to supply of a working fluid thereto and operable into a non-transmitting state in response to discharge of the working fluid therefrom. In this construction, the shifter 52 shown in FIG. 12 is omitted. And, the operated position of the forward/reverse lever 57 is inputted to the controller 64.

When the forward/reverse lever 57 is operated to the forward drive position F, the forward clutch 144a is operated into the transmitting state and the reverse clutch 144b is operated into the non-transmitting state. With this, the power of the transmission shaft 105 is transmitted via the forward clutch 144a in the forward drive condition directly to the transmission shaft 102. On the other hand, when the forward/reverse lever 57 is operated to the reverse drive position R, the reverse clutch 144b is operated into the transmitting state and the forward clutch 144a is operated into the non-transmitting state. With this, the power of the transmission shaft 105 is transmitted via the reverse clutch 144b, the reverse gear 150, the intermediate gear 151, the transmission gear 148, the transmission shaft 143, the transmission gear 147 and the forward gear 149 to the transmission shaft 102 in the forward drive condition.

Under the condition of the forward/reverse lever 57 being set at the forward drive position F (i.e. the condition of the forward clutch 144a being under the transmitting state and the reverse clutch 144b being under the non-transmitting state), instead of the transmission clutch 6, the forward clutch 144a is operated. Under the condition of the forward/reverse lever 57 being set at the reverse drive position R (i.e. the condition of the reverse clutch 144b being under the transmitting state and the forward clutch 144a being under the non-transmitting state), instead of the transmission clutch 6, the reverse clutch 144b is operated.

For the forward and reverse clutches 144a, 144b, there is provided a clutch pedal (not shown) which can be manually operated by being stepped on. With this, under the condition of the forward/reverse lever 57 being at the forward drive position F (i.e. the condition of the forward clutch 144a being under the transmitting state and the reverse clutch 144b being under the non-transmitting state), if the clutch pedal is stepped on, the forward clutch 144a is operated into the non-transmitting state. And, when the clutch pedal is released, the forward clutch 144a is operated back into the transmitting state. Under the condition of the forward/reverse lever 57 being at the reverse drive position R (i.e. the condition of the reverse clutch 144b being under the transmitting state and the forward clutch 144a being under the non-transmitting state), if the clutch pedal is stepped on, the reverse clutch 144b is operated into the non-transmitting state. And, when the clutch pedal is released, the reverse clutch 144b is operated back into the transmitting state.

[E]

The present invention may be applied to a work vehicle having right and left crawler traveling units, in place of the front wheels 53 and the rear wheels 54.

What is claimed is:

1. In a transmission including:
   first and second transmission lines disposed in parallel between an upstream transmission shaft for receiving power from an engine and a downstream transmission shaft for transmitting the power to a traveling unit;
   a hydraulic multiple disc transmission clutch disposed transmission-wise downstream of the first and second transmission lines, the power of the upstream transmission shaft being transmitted via one of the first and second transmission lines to the downstream transmission shaft;
   a first gear change-speed mechanism disposed between either the upstream transmission shaft or the downstream transmission shaft and the first transmission line, the first gear change-speed mechanism having a plurality of speed positions;
   a first actuator for operating the first gear change-speed mechanism;
   a first friction clutch incorporated in the first transmission line;
   a second gear change-speed mechanism disposed between either the upstream transmission shaft or the downstream transmission shaft and the second transmission line, the second gear change-speed mechanism having a plurality of speed positions;
   a second actuator for operating the second gear change-speed mechanism;
   a second friction clutch incorporated in the second transmission line; and
   a control apparatus for controlling the transmission, said control apparatus comprising:
   first controlling means and second controlling means; wherein
   (i) when the power is being transmitted via the first transmission line, in response to a shift of the second gear change-speed mechanism into a predetermined speed position by means of the second actuator, the first controlling means operates the transmission clutch from its transmitting state to its semi-transmitting state by reducing its working pressure to one set by said first control means while operating the first friction clutch from its transmitting state to its non-transmitting state and the second friction clutch from its non-transmitting state to its transmitting state; and
   (ii) when the power is being transmitted via the second transmission line, in response to a shift of the first gear change-speed mechanism into a predetermined speed position by means of the first actuator, the second controlling means operates the transmission clutch from its transmitting state to its semi-transmitting state by reducing its working pressure to one set by said second control means while operating the first friction clutch from its non-transmitting state to its transmitting state and the second friction clutch from its transmitting state to its non-transmitting state.

2. The control apparatus of claim 1, further comprising acceleration detecting means for detecting acceleration of the vehicle; and the transmission clutch is operated from the semi-transmitting state to the transmitting state in such a manner that the acceleration of the vehicle may have a predetermined characteristics when the transmission clutch is progressively operated from the semi-transmitting state to the transmitting state by the first and second controlling means.

3. The control apparatus of claim 1, wherein the shift of the first gear change-speed mechanism provides the transmission with an odd number speed position, and the shift of the second gear change-speed mechanism provides the transmission with an even speed position, and wherein there is provided an alternate control mode, in which mode the shift to the odd number speed position by the first controlling means and the shift to the even number speed position by the second controlling means are activated alternately of each other until completion of the shift from a previous speed position prior to issuance of the change-speed instruction to the target speed position instructed by a change-speed instruction, if the target speed position is higher or lower by two or more speeds than the previous speed position.

4. The control apparatus of claim 1, wherein there is provided a first skip change-speed mode, in which there is provided an intermediate speed position substantially midway between previous speed position prior to issuance of the change-speed instruction to the target speed position instructed by the change-speed instruction, and one of the first and second controlling means is activated for realizing shift from the previous speed position prior to issuance of the change-speed instruction to the intermediate speed position and the other of the first and second controlling means is activated for realizing subsequent shift form the intermediate speed position to the target speed position instructed by the change-speed instruction.

5. The control apparatus of claim 1, wherein there is provided a second skip change-speed mode, in which there is provided an intermediate position slightly offset from the target speed position instructed by the change-speed instruction toward the previous speed position prior to the issuance of the change-speed instruction, and one of the first and second controlling means is activated for realizing shift from the previous speed position prior to issuance of the change-speed instruction to the intermediate speed position and the other of the first and second controlling means is activated for realizing subsequent shift form the intermediate speed position to the target speed position instructed by the change-speed instruction.

6. The control apparatus of claim 1, wherein there are provided a basic control mode and a skip change-speed mode one of which can be selected;
in the basic control mode, upon issuance of a change-speed instruction, the transmission clutch is operated to the non-transmitting state and the first and second change-speed mechanism are operated to the change-speed position instructed by the change-speed instruction by means of the first and second actuators respectively, thereby to operate the transmission clutch to the transmitting state progressively; and
in the skip change-speed mode, in which there is provided an intermediate speed position substantially midway between the previous speed position prior to issuance of the change-speed instruction to the target speed position instructed by the change-speed instruction, and one of the first and second controlling means is activated for realizing shift from the previous speed position prior to issuance of the change-speed instruction to the intermediate speed position and the other of the first and second controlling means is activated for realizing subsequent shift form the intermediate speed position to the target speed position instructed by the change-speed instruction.

7. The control apparatus of claim 1, wherein a forward/reverse switchover mechanism is interposed between said hydraulic multiple disc transmission clutch and said traveling unit.

8. The control apparatus of claim 1, wherein, in response to completion of operating the first friction clutch to its non-transmitting state and the second friction clutch to its transmitting state, the first control means returns the transmission clutch to its transmitting state by progressively increasing its working pressure.

9. The control apparatus of claim 1, wherein a working pressure of the transmission clutch under its semi-transmitting state is variable.

10. The control apparatus of claim 9, wherein said first and second controlling means function such that the working pressure of the transmission clutch under the semi-transmitting state in a high-speed working run is set higher than that in a low-speed working run.

11. The control apparatus of claim 9, wherein said first and second controlling means function such that the working pressure of the transmission clutch under the semi-transmitting state is set higher for a forward run than a reverse run.

12. The control apparatus of claim 9, wherein said first and second controlling means function such that the working pressure of the transmission clutch under the semi-transmitting state is set higher for a working run than a road run.

13. The control apparatus of claim 9, further comprising load detecting means for detecting a traveling load to the vehicle, and the first and second controlling means are constructed such that the working pressure of the transmission clutch under its semi-transmitting state is increased in response to increase in the detected traveling load.

14. The control apparatus of claim 13, wherein said load detecting means operates to detect a difference between a revolution of the engine under zero load condition and a current revolution of the engine and detect the traveling load based on the revolution difference or to detect a reduction ratio in the traveling speed of the vehicle at the time of start of a change-speed operation and then detect the traveling load based on the detected reduction ratio in the traveling speed of the vehicle.

15. The control apparatus of claim 13, wherein said load detecting means operates to detect a reduction ratio in the traveling speed of the vehicle when said first and second controlling means begin to operate and then detect the traveling load based on the detected reduction ratio in the traveling speed of the vehicle.

16. The control apparatus of claim 1, wherein there are provided a basic control mode and an alternate control mode one of which can be selected;
in the basic control mode, upon issuance of a change-speed instruction, the transmission clutch is operated to the non-transmitting state and the first and second change-speed mechanism are operated to the change-speed position instructed by the change-speed instruction by means of the first and second actuators respectively, thereby to operate the transmission clutch to the transmitting state progressively; and
in the alternate control mode, the first and second controlling means are alternately actuated until completion of shifting from the previous speed position prior to the issuance of the change-speed instruction to the target speed position instructed by the change-speed instruction, thereby to realize the shifting to the target speed position instructed by the change-speed instruction.

17. The control apparatus of claim 16, wherein determination is made whether the vehicle is engaged in a drafting work or not, and if it is determined that the vehicle is not engaged in the drafting work, the basic control mode is automatically selected, and if it is determined that the vehicle is engaged in the drafting work, the alternate control mode is automatically selected.

18. The control apparatus of claim 16, wherein if the traveling speed of the vehicle is higher than a predetermined value, the basic mode is automatically selected, and if the traveling speed of the vehicle is lower than the predetermined value, the alternate control mode is automatically selected.

19. The control apparatus of claim 16, wherein an altitude of a ground-work vehicle connected to the vehicle body relative to this vehicle body is detected, and if the detected altitude is higher than a predetermined value, the basic control mode is automatically selected, and if the detected altitude is lower than the predetermined value, the alternate control mode is automatically selected.

20. The control apparatus of claim 16, wherein manual selecting means is provided for allowing manual selection between the basic control mode and the alternate control mode.

21. The control apparatus of claim 16, wherein a traveling load applied to the vehicle is detected, and when the detected traveling load is below a predetermined value, said basic control mode is automatically selected, and when the detected traveling load is above the predetermined value, said alternate control mode is automatically selected.

22. The control apparatus of claim 16, wherein a towing load applied to the vehicle is detected, and when the detected towing load is below a predetermined value, said basic control mode is automatically selected, and when the detected towing load is above the predetermined value, said alternate control mode is automatically selected.

23. In a transmission including:
   first and second transmission lines disposed in parallel between an upstream transmission shaft for receiving power from an engine and a downstream transmission shaft for transmitting the power to a traveling unit; the power being transmitted via one of the first and second transmission lines to the downstream transmission line;
   a forward/reverse switchover mechanism having a forward clutch and a reverse clutch both of hydraulic multiple disc type and disposed between the engine and the upstream transmission shaft;
   a first gear change-speed mechanism disposed between either the upstream transmission shaft or the downstream transmission shaft and the first transmission line, the first gear change-speed mechanism having a plurality of speed positions;
   a first actuator for operating the first gear change-speed mechanism;
   a first friction clutch incorporated in the first transmission line;
   a second gear change-speed mechanism disposed between either the upstream transmission shaft or the downstream transmission shaft and the second transmission line, the second gear change-speed mechanism having a plurality of speed positions;
   a second actuator for operating the second gear change-speed mechanism; and
   a second friction clutch incorporated in the second transmission line;
   a control apparatus for controlling the transmission, said control apparatus comprising:
   first controlling means and second controlling means; wherein
   (i) when the power is being transmitted via the first transmission line, in response to a shift of the second gear change-speed mechanism into a predetermined speed position by means of the second actuator, the first controlling means operates said forward clutch or said reverse clutch from its transmitting state to its semi-transmitting state by reducing its working pressure to one set by said first control means while operating the first friction clutch from its transmitting state to its non-transmitting state and the second friction clutch from its non-transmitting state to its transmitting state; and
   (ii) when the power is being transmitted via the second transmission line, in response to a shift of the first gear change-speed mechanism into a predetermined speed position by means of the first actuator, the second controlling means operates said forward clutch or said reverse clutch from its transmitting state to its semi-transmitting state by reducing its working pressure to one set by said second control means while operating the first friction clutch from its non-transmitting state to its transmitting state and the second friction clutch from its transmitting state to its non-transmitting state.

24. The control apparatus of claim 23, wherein, in response to completion of operating the first friction clutch to its non-transmitting state and the second friction clutch to its transmitting state, the first control means returns the said forward clutch or said reverse clutch to its transmitting state by progressively increasing its working pressure.

25. The control apparatus of claim 23, wherein the shift of the first gear change-speed mechanism provides the transmission with an odd number speed position, and the shift of the second gear change-speed mechanism provides the transmission with an even speed position, and wherein there is provided an alternate control mode, in which mode the shift to the odd number speed position by the first controlling means and the shift to the even number speed position by the second controlling means are activated alternately of each other until completion of the shift from a previous speed position prior to issuance of the change-speed instruction to the target speed position instructed by a change-speed instruction, if the target speed position is higher or lower by two or more speeds than the previous speed position.

26. In a transmission including:
   first and second transmission lines disposed in parallel between an upstream transmission shaft for receiving power from an engine and a downstream transmission shaft for transmitting the power to a traveling unit; the power being transmitted via one of the first and second transmission lines to the downstream transmission line;
   a forward/reverse switchover mechanism having a forward clutch and a reverse clutch both of hydraulic multiple disc type and disposed transmission-wise downstream of the first and second transmission lines,
   a first gear change-speed mechanism disposed between either the upstream transmission shaft or the downstream transmission shaft and the first transmission line, the first gear change-speed mechanism having a plurality of speed positions;
   a first actuator for operating the first gear change-speed mechanism;
   a first friction clutch incorporated in the first transmission line;
   a second gear change-speed mechanism disposed between either the upstream transmission shaft or the downstream transmission shaft and the second transmission line, the second gear change-speed mechanism having a plurality of speed positions;
   a second actuator for operating the second gear change-speed mechanism;
   a second friction clutch incorporated in the second transmission line; and
   a control apparatus for controlling the transmission, said control apparatus comprising:
   first controlling means and second controlling means; wherein
   (i) when the power is being transmitted via the first transmission line, in response to a shift of the second gear change-speed mechanism into a predetermined speed position by means of the second actuator, the first controlling means operates said forward clutch or said reverse clutch from its transmitting state to its semi-transmitting state by reducing its working pressure to one set by said first controlling means while operating the first friction clutch from its transmitting state to its non-transmitting state and the second friction clutch from its non-transmitting state to its transmitting state; and (ii) when the power is being transmitted via the second transmission line, in response to a shift of the first gear change-speed mechanism into a predetermined speed position by means of the first actuator, the second controlling means operates said forward clutch or said reverse clutch from its transmitting state to its semi-transmitting state by reducing its working pressure to one set by said second control means while operating the first friction clutch from its non-transmitting state to its transmitting state and the second friction clutch from its transmitting state to its non-transmitting state.

27. The control apparatus of claim 26, wherein, in response to completion of operating the first friction clutch to its non-transmitting state and the second friction clutch to its transmitting state, the first control means returns the said forward clutch or said reverse clutch to its transmitting state by progressively increasing its working pressure.

28. The control apparatus of claim 26, wherein the shift of the first gear change-speed mechanism provides the transmission with an odd number speed position, and the shift of the second gear change-speed mechanism provides the transmission with an even speed position, and wherein there is provided an alternate control mode, in which mode the shift to the odd number speed position by the first controlling means and the shift to the even number speed position by the second controlling means are activated alternately of each other until completion of the shift from a previous speed position prior to issuance of the change-speed instruction to the target speed position instructed by a change-speed instruction, if the target speed position is higher or lower by two or more speeds than the previous speed position.

29. In a transmission including:

first and second transmission lines disposed in parallel between an upstream transmission shaft for receiving power from an engine and a downstream transmission shaft for transmitting the power to a traveling unit;

a hydraulic multiple disc transmission clutch disposed transmission-wise upstream of the first and second transmission lines, the power of the upstream transmission shaft being transmitted via one of the first and second transmission lines to the downstream transmission shaft;

a first gear change-speed mechanism disposed between either the upstream transmission shall or the downstream transmission shaft and the first transmission line, the first gear change-speed mechanism having a plurality of speed positions;

a first actuator for operating the first gear change-speed mechanism;

a first friction clutch incorporated in the first transmission line;

a second gear change-speed mechanism disposed between either the upstream transmission shaft or the downstream transmission shaft and the second transmission line, the second gear change-speed mechanism having a plurality of speed positions;

a second actuator for operating the second gear change-speed mechanism; and a second friction clutch incorporated in the second transmission line;

a control apparatus for controlling the transmission, said control apparatus comprising:

first controlling means and second controlling means; wherein (i) when the power is being transmitted via the first transmission line, in response to a shift of the second gear change-speed mechanism into a predetermined speed position by means of the second actuator, the first controlling means operates the transmission clutch from its transmitting state to its semi-transmitting state by reducing its working pressure to one set by said first control means while operating the first friction clutch from its transmitting state to its non-transmitting state and the second fiction clutch from its non-transmitting state to its transmitting state; and (ii) when the power is being transmitted via the second transmission line, in response to a shift of the first gear change-speed mechanism into a predetermined speed position by means of the first actuator, the second controlling means operates the transmission clutch from its transmitting state to its semi-transmitting state by reducing its working pressure to one set by said second control means while operating the first friction clutch from its non-transmitting state to its transmitting state and the second friction clutch from its transmitting state to its non-transmitting state.

30. The control apparatus of claim 29, wherein, in response to completion of operating the first friction clutch to its non-transmitting state and the second friction clutch to its transmitting state, the first control means returns the transmission clutch to its transmitting state by progressively increasing its working pressure.

31. The control apparatus of claim 29, wherein the shift of the first gear change-speed mechanism provides the transmission with an odd number speed position, and the shift of the second gear change-speed mechanism provides the transmission with an even speed position, and wherein there is provided an alternate control mode, in which mode the shift to the odd number speed position by the first controlling means and the shift to the even number speed position by the second controlling means are activated alternately of each other until completion of the shift from a previous speed position prior to issuance of the change-speed instruction to the target speed position instructed by a change-speed instruction, if the target speed position is higher or lower by two or more speeds than the previous speed position.

* * * * *

UNITED STATES PATENT AND TRADEMARK OFFICE
CERTIFICATE OF CORRECTION

PATENT NO. : 6,851,328 B1
DATED : February 8, 2005
INVENTOR(S) : Umemoto et al.

It is certified that error appears in the above-identified patent and that said Letters Patent is hereby corrected as shown below:

Column 32,
Line 50, "a predetermined characteristics" should read -- a predetermined characteristic --

Column 33,
Lines 11, 23 and 47, "shift form the" should read -- shift from the --

Column 37,
Line 54, "transmission shall" should read -- transmission shaft --

Signed and Sealed this

Twelfth Day of July, 2005

JON W. DUDAS
*Director of the United States Patent and Trademark Office*